(12) United States Patent
Matthes et al.

(10) Patent No.: US 12,385,513 B2
(45) Date of Patent: Aug. 12, 2025

(54) BAYONET CONNECTOR, COMPONENT COMPOSITE COMPRISING SAID BAYONET CONNECTOR, A PRODUCTION METHOD FOR THE BAYONET CONNECTOR, AND A METHOD FOR CONNECTING AT LEAST TWO COMPONENTS USING SAID BAYONET CONNECTOR

(71) Applicant: Böllhoff Verbindungstechnik GmbH, Bielefeld (DE)

(72) Inventors: Jörg Matthes, Herford (DE); Viktor Zelmer, Bielefeld (DE); Michaela Mücke, Detmold (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 713 days.

(21) Appl. No.: 17/299,862

(22) PCT Filed: Nov. 6, 2019

(86) PCT No.: PCT/EP2019/080359
§ 371 (c)(1),
(2) Date: Jun. 4, 2021

(87) PCT Pub. No.: WO2020/114702
PCT Pub. Date: Jun. 11, 2020

(65) Prior Publication Data
US 2022/0120300 A1    Apr. 21, 2022

(30) Foreign Application Priority Data

Dec. 6, 2018   (DE) .................... 102018131200.8
Apr. 8, 2019   (DE) .................... 102019109211.6

(51) Int. Cl.
*F16B 21/09*     (2006.01)
*F16B 5/06*      (2006.01)
*F16B 21/14*     (2006.01)

(52) U.S. Cl.
CPC ............ *F16B 21/09* (2013.01); *F16B 5/0642* (2013.01); *F16B 5/0664* (2013.01); *F16B 21/14* (2021.08); *Y10T 403/7005* (2015.01)

(58) Field of Classification Search
CPC ........ F16B 5/06; F16B 5/0607; F16B 5/0621; F16B 5/0642; F16B 5/0664; F16B 5/0671;
(Continued)

(56) References Cited

U.S. PATENT DOCUMENTS 2,670,513 A   3/1954   Schlueter
2,788,047 A   4/1957   Rapata
(Continued)

FOREIGN PATENT DOCUMENTS

DE        9116244 U1    5/1992
DE    202007002704 U1   7/2008
(Continued)

OTHER PUBLICATIONS

Written Opinion & International Search Report for PCT/EP2019/080359 dated Feb. 10, 2020, (20 pages).
(Continued)

*Primary Examiner* — Amber R Anderson
*Assistant Examiner* — Kevin J Baynes
(74) *Attorney, Agent, or Firm* — Reising Ethington P.C.

(57) ABSTRACT

A one-part male bayonet connector, by means of which at least two components are releasably connectable to one another in a non-destructible manner via an opening, which bayonet connector has a double T-like form in a side view, consisting of a head, a central shaft extending therefrom, and
(Continued)

Figure 1:
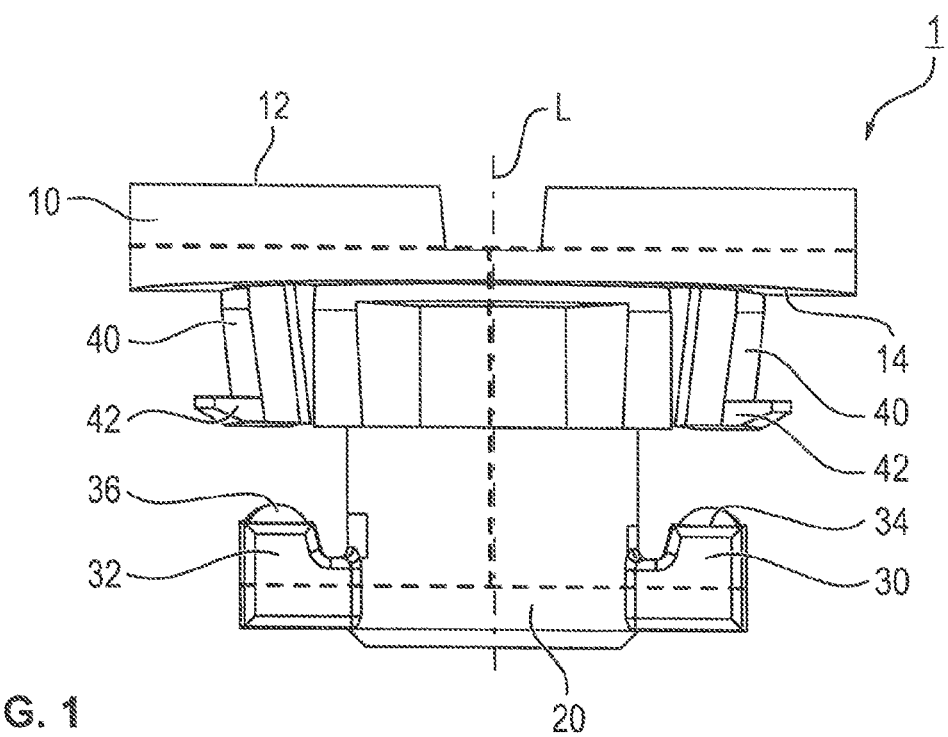

two radial webs extending diametrically from the shaft, which each comprise a fastening means of the bayonet connector facing the head so that, in addition to an interlocking bayonet connection, a frictional connection of the at least two components can be produced between the head and the fastening means of the radial webs.

13 Claims, 19 Drawing Sheets

(58) Field of Classification Search
CPC .......... F16B 21/02; F16B 21/04; F16B 21/09; F16B 21/14; F16B 19/1081; F16B 21/084; F16B 21/086; Y10T 403/7005
USPC .................................................. 411/508–510
See application file for complete search history.

(56) References Cited

U.S. PATENT DOCUMENTS

| | | | | |
|---|---|---|---|---|
| 3,177,540 | A | * | 4/1965 | Hall ...................... F16B 21/086 24/453 |
| 3,407,454 | A | * | 10/1968 | Myatt ...................... F16B 21/02 411/549 |
| 4,149,429 | A | | 4/1979 | Pfenning |
| 4,194,429 | A | | 3/1980 | Wright |
| 4,403,895 | A | * | 9/1983 | Caldwell ................ F16B 35/04 411/908 |
| 4,705,442 | A | * | 11/1987 | Fucci ...................... F16B 21/08 24/453 |
| 4,756,653 | A | * | 7/1988 | Berger ................ F16B 23/0038 411/908 |
| 4,987,714 | A | * | 1/1991 | Lemke ................ F16B 19/1081 52/410 |
| 5,255,485 | A | * | 10/1993 | Lemke ................ F16B 19/1081 7/165 |
| 5,599,149 | A | * | 2/1997 | Clemente ............. F16B 25/0078 411/386 |
| 5,658,110 | A | * | 8/1997 | Kraus ................... F16B 21/086 411/908 |
| 5,716,161 | A | * | 2/1998 | Moore ..................... F16B 35/06 24/453 |
| 6,237,970 | B1 | | 5/2001 | Joannou |
| 7,328,489 | B2 | * | 2/2008 | Leverger ................. F16B 21/09 24/297 |
| 8,262,333 | B2 | | 9/2012 | Bücker et al. |
| 8,495,802 | B2 | * | 7/2013 | Okada ................. B60R 13/0206 24/453 |
| 9,963,087 | B2 | * | 5/2018 | Leverger ............... F16B 13/045 |
| 10,968,938 | B2 | | 4/2021 | Leidig et al. |
| 11,261,899 | B2 | * | 3/2022 | Zander .................... F16B 21/02 |
| 2009/0208311 | A1 | * | 8/2009 | Churchill .............. F16B 37/043 411/516 |
| 2010/0254151 | A1 | | 10/2010 | Peter |
| 2016/0040705 | A1 | | 2/2016 | Peter et al. |

FOREIGN PATENT DOCUMENTS

| | | |
|---|---|---|
| DE | 202008007378 U1 | 10/2008 |
| DE | 202009004351 U1 | 8/2010 |
| DE | 102013006720 A1 | 10/2014 |
| DE | 102017125722 A1 | 5/2019 |
| EP | 3037603 B1 | 12/2018 |
| FR | 2027619 A6 | 10/1970 |
| FR | 2911647 A1 | 7/2008 |
| GB | 2423647 A | 8/2006 |

OTHER PUBLICATIONS

English translation of the International Preliminary Report on Patentability for PCT/EP2019/080359 dated Jun. 8, 2021, (20 pages).
CN Office Action for CN Application No. 201980089616.1 dated Jun. 8, 2022, (11 pages).

* cited by examiner

BAYONET CONNECTOR, COMPONENT COMPOSITE COMPRISING SAID BAYONET CONNECTOR, A PRODUCTION METHOD FOR THE BAYONET CONNECTOR, AND A METHOD FOR CONNECTING AT LEAST TWO COMPONENTS USING SAID BAYONET CONNECTOR

1. TECHNICAL FIELD

The present disclosure is related to a one-part male bayonet connector with which at least two components are releasably connectable with each other via a first opening each in a non-destructive manner. Furthermore, the present disclosure relates to a component composite or bond of at least one first and one second component, which is produced with the help of the bayonet connector. Moreover, the present disclosure comprises a manufacturing method for this bayonet connector as well as a connection method for the at least two components and the mentioned bayonet connector.

2. BACKGROUND

In the state of the art, it is a common technical problem to releasably connect two components with each other. This problem arises for example in the vehicle construction where add-on parts, cladding parts in the vehicle inside as well as coverings in the engine compartment must be fixed in a releasable manner.

In order to connect two components, it is for example a common method to provide one component with a ball head bolt while the other component comprises a coupling part. This coupling part is fastened in an opening of the second component. A connection between the first component and the second component is established by a snapping of the ball head in the coupling part. Due to the longitudinal extension of the ball bolt, this plug-in coupling takes up an installation space which is not always advantageous. Such a plug-in coupling is for example described in DE 20 2009 004 351 U1.

Furthermore, it is popular in the state of the art to connect two components with the help of a screw clip. For this purpose, a dowel-like screw clip is arranged in the opening of a first component. A screw is then screwed through the opening of the second component into the screw clip of the first component in order to establish a connection. Corresponding constructions arise from DE 20 2008 007 378 U1 as well as U.S. Pat. No. 2,788,047. These arrangements have the disadvantage that for the establishing of the connection between the at least two components, two connection means, i.e. the screw clip and a matching screw must be used. This requires a relatively high installation effort as well as the corresponding provision of the two component means.

It is therefore the object of at least some implementations of the present disclosure to provide an effective connection possibility for at least two components, the manufacturing effort of which is limited and which furthermore realizes a releasable connection.

3. SUMMARY

The above object is solved by a one-part male bayonet connector, by a component composite of at least a first and a second component and the bayonet connector, by a component composite of a first component and the bayonet connector, by a manufacturing method for the mentioned bayonet connector as well as by a connection method for at least a first component with a first opening and a second component with a keyhole with the help of the mentioned bayonet connector. Further designs and developments arise from the subsequent description, the accompanying drawings as well as the appending claims.

With the one-part male bayonet connector, at least two components are releasably connectable with each other via one opening each in a non-destructive way. In a lateral view, the bayonet connector has a double-T like shape consisting of a head, a central shaft extending from it and two diametrically extending radial webs extending from the shaft, each having a fastening means of the bayonet connector which faces the head, so that by a form-fit bayonet connection, the at least two components are fastenable between the head and the fastening means of the radial webs.

A basic configuration of the bayonet connector consists of the mentioned head from which the shaft extends centrally. In turn, at the shaft, the two radial webs which are diametrically arranged to each other, are fastened at a distance to the head. Due to this configuration, it is possible to connect at least two components with each other via a respective opening present in them. For this purpose, the bayonet connector is plugged through both openings and fastened by a rotation. In order to keep the fastening effort or connection effort low, this rotation of the bayonet connector comprises a rotation angle that is smaller than 180°. Due to this rotation, the at least two components that are to be connected with each other may be clamped between the head and the radial webs. As before that, the shaft with the radial webs may be guided through a keyhole in the second component, i.e. the component that faces away from the head, the rotation also leads to a form-fit connection between bayonet connector and second component, besides a clamping of the two components. A clamping of the two components is possible when one of the components is compressible in the connection direction of the bayonet connector or when a compressible sealing is arranged between the components.

In order to release the connection of the at least two components, the bayonet connector must be rotated. The rotation can take place in the same or in the opposite direction compared with the connection rotation. The releasing does not lead to a damaging of the bayonet connector or the components. Accordingly, a non-destructive releasing of the connection takes place. As soon as the bayonet connector has been rotated backward or forward so far that the radial webs can pass the keyhole in the second component, the bayonet connector can be removed from the two openings of the at least two components.

According to a further embodiment, the two radial webs are configured rigid. This construction of the radial webs allows that a force is applied onto the second component, which faces away from the head, in the direction of the head of the bayonet connector via the radial webs. In this way, it is guaranteed that the two components which are to be connected with each other be clamped between the radial webs and a bottom side of the head of the bayonet connector. Accordingly, due to the configuration of the bayonet connector, the at least two components are held by a combined form-fit and force-fit connection.

According to a further embodiment, the two radial webs are configured in form of an L and a shorter L leg comprises the fastening means at a face side which faces towards the head. The fastening means may be a locking web, a semi-spherical like projection or a ramp slope which is arranged such that it is not parallel to a bottom side of the head.

Firstly, the two radial webs have a certain longitudinal extension in the radial direction. This guarantees that on the one side, the radial webs form a suitable shape for the keyhole to be passed in the second component. On the other side, this configuration also guarantees that after a rotation of the bayonet connector about its longitudinal axis, the radial webs or the whole bayonet connector, respectively, can lock at the second component in a form-fit manner. Because after this rotation, the radial webs can no longer run through the keyhole in the second component in a releasable manner.

While at this point, radial webs which are configured straight could also be used as radial webs, the L shape may be used. The fastening means may be located at the face side, which faces towards the head, of the shorter L leg, with the fastening means establishing a connection with the adjacent second component after rotation is completed. Due to the configuration of the radial webs, a locking connection or a frictional connection may be established between the radial webs and the adjacent second component. For this purpose, the fastening means consists of a locking web, which may hook into a recess or opening or into two intermediate spaces between adjacent locking ribs. According to a further alternative, the semi-spherical like projection is provided as the locking means. It may snap into a bore or a recess in the second component which faces towards the locking web. According to a further design of the fastening means at the radial webs, the face side which faces towards the second component comprises a ramp slope. This ramp slope may be configured such that the connecting or fastening rotation of the bayonet connector about its longitudinal axis presses the ramp slope in a wedge-like manner against the adjoining surface of the second component. Depending on the size of the rotation angle of the fastening rotation of the bayonet connector, the connection force of the frictional connection between the radial webs and the second component can thus also be adjusted. It is to be understood that when using ramp slopes, a releasing of the connection takes place in the opposite rotation direction than the establishing of a connection.

According to a further design, the radial webs have a lower radial extension than the head of the bayonet connector. The background of this configuration is that the shaft with radial webs may first of all be plugged through a first opening in the first component and subsequently through the keyhole in the second component. If the radial webs had the same radial extension as the head of the bayonet connector, one could also plug the head of the bayonet connector through the first opening in the first component. Accordingly, it would not be possible that the head of the bayonet connector also rests against the first component, despite the presence of the first opening.

According to a further embodiment, the bayonet connector comprises at least one positioning web which extends from a bottom side of the head in the direction of the shaft of the bayonet connector. This positioning web may be arranged radially inwardly with a distance to a radial outer side of the head and provides an axial undercut, which may be a locking hook, radially outwardly.

According to a further embodiment, the positioning web serves for securing a pre-position of the bayonet connector in the at least one first component. This opens up the possibility that a first component with a pre-assembled bayonet connector can be provided for the connecting with a second component. In this way, assembly time can be preponed so that the final assembly, i.e. the actual connecting of the at least one first and second component with the help of the bayonet connector, can take place in a shorter period of time.

According to a constructive design, the positioning web with its axial undercut serves for the purpose that it may lock at the edge of the first opening in the first component. In this way, firstly, the bayonet connector is held in the first opening, even if a connection between the first and the second component has not yet been established by the bayonet connector. As the positioning web projects in the direction of the shaft of the bayonet connector from the bottom side of the head of the bayonet connector, it is arranged suitably in such a way that it interacts with the edge of the first opening of the first component or a portion adjacent to the first opening of the first component. One kind of the interaction is that the positioning web locks by its axial undercut at the edge of the first opening, as described above. If the inner course of the first opening has projections that are arranged radially inwardly or has at least one projection which is directed radially inwardly, then, the interaction of the positioning web with the at least one radial projection at the inner side of the first opening may provide for a locking connection which limits or blocks a rotation of the bayonet connector about its longitudinal axis. If, two radial projections may be arranged at the inner side of the first opening of the first component, the at least one positioning web may be locked in this intermediate space between the two adjacent radial projections. In this way, the position, which may be a pre-position, of the bayonet connector is determined so that in this way, the connecting of the at least two components with the help of the bayonet connector can be prepared.

According to a further design, the positioning web provides a locking means which is directed radially outwardly, with which a rotation of the bayonet connector in a pre-position can be prevented. For this purpose, the positioning web may be constructed fork-like with two locking hooks separated by an intermediate space.

It has already been described above that a single positioning web can be locked between two radial projections at the inner course of the first opening of the first component. Alternatively to that, only one radial projection at the inner side of the first opening of the first component may be provided. This only one radial projection at the inner side of the first opening interacts with a fork-like formed positioning web. The fork-like form arises from two adjacent locking hooks which are arranged next to each other, similar to two prongs of a fork, and project from the bottom side of the head in the direction of the shaft. The distance of these two fork-like locking hooks is chosen such that the radial projection engages into this intermediate space at the inner side of the first opening and can lock there. In this way, a desired pre-position of the bayonet connector in the first opening of the first component can also be defined and adjusted. In this context, several radial projections may be provided which are spaced from each other in the circumferential direction of the first opening. Every single radial projection then corresponds to a pre-position for the bayonet connector in the first opening of the first component which is advantageous for a later connecting of the at least two components.

Furthermore, the present disclosure comprises a further design of a one-part male bayonet connector with which at least two components are releasably connectable with each other in a non-destructive manner via one opening each. In a lateral view, this bayonet connector has a T-like shape consisting of a head, a central shaft extending from there and two opposite thread webs extending radially from the shaft, each providing a fastening means of the bayonet connector facing the head, so that by means of a form-fit bayonet connection, the at least two components are fastenable between the head and the fastening means of the thread webs.

The above-described further alternative of the bayonet connector is characterized by a T-shaped structure with head and shaft extending from there. In contrast to the above-described embodiments, only two thread webs may extend radially outwardly from radially opposite sides of the shaft in radial direction. These thread webs are configured helically and correspondingly run arc-shaped in a radial lateral view.

These two thread webs include similar fastening means at their face sides, which face towards the head, in the way they are used in the above-described alternative of the bayonet connector. These correspond to the above-described fastening means in terms of structure, construction and function.

Due to the thread webs of the bayonet connector, it is necessary that the bayonet connector be rotated into the keyhole of the second component. Because the helical design of the thread webs prevents a straight-lined inserting. This rotating-in has the advantage that by that, the bayonet connector may screw the at least two components to be connected with each other via their openings. The result of this screwing is that due to the rotation of the bayonet connector about its central longitudinal axis, i.e. the central longitudinal axis of the rivet shaft of the bayonet connector, the at least two components as well as the head of the bayonet connector are moved towards each other in a relative way. In this way, a clamping of the at least two components against the bottom side of the head of the bayonet connector may be realized, which at the end of the rotation may be fixed through a locking or frictional fastening of the fastening means. Thus, the rotation movement, which is necessary anyway for the fastening of the bayonet connector, about its longitudinal axis additionally realizes a pulling torque in the direction of the bottom side of the head of the bayonet connector, which may press the components to be connected with each other against the bottom side of the head of the bayonet connector.

According to a further embodiment of the previously described bayonet connector, the two thread webs are configured rigid. The two thread webs may define a right-handed thread or a left-handed thread. The right-handed or the left-handed thread may be characterized by a pitch angle $\alpha$ with respect to a normal regarding a central longitudinal axis of the shaft in the range of $10°\leq\alpha\leq60°$, or $30°\leq\alpha\leq50°$ and $40°\leq\alpha\leq45°$.

The thread webs define either a right-handed thread or a left-handed thread. This depends on the direction of the helical-like course of the thread webs. The consequence of this construction alternative is that the bayonet connector may establish the desired connection between the at least two components by means of either a right rotation in case of a right-handed thread or a left rotation in case of a left-handed thread. The choice between right-handed thread and left-handed thread is advantageous in order to for example adapt the connection to be established to space requirements. Furthermore, with the choice of the suitable thread, reference can be made to national requirements or habits.

According to a further design, the two thread webs of the bayonet connector may define a steep thread so that the bayonet connector can be completely fastened with a rotation about its longitudinal axis with a rotation angle $\beta$ of $\beta<360°$, or $\beta\leq180°$ or $\beta\leq100°$.

The above-described thread webs may form a steep thread with the above-described inclination angle. A steep thread is characterized by the fact that a small radial movement, i.e. a rotation about the central longitudinal axis of the shaft about only a small rotation angle, is transmitted into an as big as possible axial movement, i.e. a movement in the direction of the central longitudinal axis of the shaft. If the bayonet connector had a classic thread, several complete rotations about its longitudinal axis would be necessary in order to establish a connection between the at least two components. By using the steep thread, which may be less than a complete rotation of the bayonet connector about its longitudinal axis is sufficient in order to establish the connection between the at least two components. In case of a suitable form of the steep thread, namely in case of a choice of the pitch angle of the thread flanks, a size of the fastening rotation angle $\beta$ may be adjusted in a targeted manner. A rotation of the bayonet connector with a rotation angle of $\beta\leq180°$ or $\beta\leq100°$ or even $\beta\leq90°$ may be used in order to completely fasten the bayonet connector.

The two thread webs may have a smaller radial extension than the head. According to a further design, the radial extension of the thread webs may be smaller than the radial extension of the head of the bayonet connector. This constructive design makes it possible that the bottom side of the head rests at the first component while the shaft with the thread webs can freely run through the first opening of the first component.

According to a further embodiment, the two thread webs may have a decreasing radial extension in the direction of the shaft which faces away from the head so that the bayonet connector ends in a finder tip in axial direction opposite to the head.

The thread webs which may be only two thread webs which may be arranged opposite to each other, extend helically in the longitudinal direction of the bayonet connector. According to a further design of the bayonet connector, the radial extension of the individual thread webs may be of the same size at its axial starting point and at its axial end point. The radial extension of the thread webs may be adapted to the opening of the keyhole in the second component such that the thread webs can be screwed in there.

According to a further design, the thread webs may have the biggest radial extension at their end which may be close to the head. In the direction of the end which faces away from the head, of the shaft of the bayonet connector, the radial extension of the two thread webs may decrease continuously in the same way, so that the radial extension of the thread webs at the end of the shaft which faces away from the head has reduced to zero. As a result of this constructive design, the shaft of the bayonet connector may form a tip-like end portion at its end which faces away from the head. This portion is also referred to as finder tip. Because the finder tip may have the advantage that it facilitates a threading or inserting of the bayonet connector with the finder tip first into the first opening of the first component and/or into the keyhole of the second component. Because firstly, it is only necessary that the finder tip encounters the central opening of the keyhole. In this connection, it is not yet necessary that the thread webs must be aligned precisely with the radial opening slots of the keyhole. As soon as the finder tip is arranged in the central opening of the keyhole, the bayonet connector can be rotated about its longitudinal axis with the help of this form-fit positioning help so far until the thread webs have the fitting alignment with respect to the radial slots of the keyhole in the second component. In this way, the finder tip facilitates the inserting of the bayonet connector into the component openings and thus the establishing of the connection between the at least two components.

Similarly and analogously to the above-described constructive alternatives of the bayonet connector, the fastening means may be a locking web, a semi-spherical like projection of a ramp slope which is arranged not parallel to a bottom side of the head.

The fastening means, which may establish a connection with the adjacent second component after the rotation has taken place, is located on the respective face side, which faces away from the head, of the thread web. Due to the configuration of the thread webs, a locking connection or a frictional connection may be established between the thread webs and the adjacent second component. For this purpose, the fastening means consists of a locking web which may engage into a recess or opening. According to a further alternative, the semi-spherical like projection is provided as the locking means. It may snap into a bore or a recess in the second component, which faces the thread web. According to a further design of the fastening means at the thread webs, the face side, which faces the second component, comprises a ramp slope. This ramp slope may be configured such that the connecting or fastening rotation of the bayonet connector about its longitudinal axis presses the ramp slope in a wedge-like manner against the adjoining surface of the second component. Depending on the size of the rotation angle $\beta$ of the fastening rotation of the bayonet connector, the connecting force of the frictional connection between the thread webs and the second component can thereby be adjusted. It is to be understood that when using ramp slopes, a releasing of the connection in the opposite rotation direction than the establishing of a connection takes place.

According to a further embodiment of the bayonet connector, it may include at least one pre-positioning web which extends from a flange-like offset bottom side of the head in radial direction in order to be lockable at an opening edge of a first component.

In a similar way as in case of the above-described alternative design of the bayonet connector, it is advantageous that the bayonet connector can first of all be pre-positioned in the first opening of the first component. For this purpose, the bayonet connector with thread webs may include a flange-like projection at its head bottom side which projects in axial direction. This flange-like projection may have a diameter which is smaller than an outer diameter of the head and which does not extend beyond the inner diameter of the first opening in the first component. At the radial outer side of this flange-like projection, which may be elastically deformable pre-positioning webs in the form of webs, bumps or generally elevations are provided which form a releasable friction connection with the inner side of the first opening of the first component or at the edge of the first opening of the first component. As soon as the bayonet connector with thread webs has been pressed into the first opening of the first component, these pre-positioning webs lock or clamp at the adjacent wall of the first component.

This offers the possibility that the bayonet connector can already be pre-positioned in the first component opening of the first component before the connection between the first component and in the second component is established. Accordingly, with this approach, cycle times for establishing the connection between the at least two components may be reduced as the pre-positioning of the bayonet connector with thread webs in the first component can be preponed.

According to different embodiments of the bayonet connector, it may consist of plastic or metal. For the manufacturing of the bayonet connector, an injection moulding method for plastic and a metal die casting method for metal may be used. According to different embodiments, the bayonet connector may be produced out of aluminium in an aluminium die casting method or out of tin in a tin die casting method. According to another alternative, the bayonet connector is made of plastic within the frame of an injection moulding method. Suitable materials for that would for example be thermoplastic materials such as PPA GF50 or polyamide (PA).

The present disclosure furthermore comprises a component composite of at least a first and a second component and one of the above-described alternative designs of the bayonet connector according to the different embodiments. In this component composite, the first component may be arranged adjacent to the head of the bayonet connector and comprises a first opening. The second component comprises a keyhole so that the head rests at the first component, the shaft with the radial webs runs through the first opening and the keyhole and the radial webs or the thread webs are locked at the second component in a way facing away from the head.

The present disclosure includes a further component composite of at least one first component and the bayonet connector according to one of the above-described designs, in which the bayonet connector with the positioning webs or with a plurality of pre-positioning webs in form of bumps of a flange-like projection at the head bottom side of the bayonet connector may be releasably locked at an edge of a first opening of the first component.

With regard to this component composite, the positioning web according to the first alternative of the bayonet connector may provide a locking means which is directed radially outwardly, with which a rotation of the bayonet connector in a pre-position can be prevented. The positioning web may be constructed fork-like with at least two locking hooks, separated by at least one intermediate space, and that a projection be locked in or at the first opening of the first component with the positioning web.

According to the second alternative of the bayonet connector, which comprises the thread webs, radially projecting pre-positioning webs are provided. The pre-positioning webs guarantee a pre-positioning of the bayonet connector with thread webs in the first component opening without an angle position of the bayonet connector being fixed in the first component opening. Nevertheless, the bayonet connector is reliably held in the first component and can be delivered with it.

Furthermore, the present disclosure includes a manufacturing method of the bayonet connector as designed according to the above-mentioned embodiments. The manufacturing method includes the following steps: providing a mould which is suitable for injection-moulding with plastic or metal die casting and is configured complementary with respect to the form features of the bayonet connector according to one of the above-described designs, filling of the mould with liquid plastic or liquid metal, curing of the plastic or of the metal in the mould and de-moulding the cured bayonet connector.

In order to produce the bayonet connector, an injection moulding method for plastic or a metal die casting method for metals, specifically aluminium, may be used. For this purpose, the respectively used moulds have the complementary features of the bayonet connector according to the above-described d embodiments. In order to produce the bayonet connector, one relies on known method steps from the plastic injecting moulding or the metal die casting.

The present disclosure furthermore includes a connection method for at least one first component with a first opening and a second component with a keyhole with the help of the above-described bayonet connector according to the different embodiments. The connection method includes the following steps: stack-like arranging of the first and the second component so that the first opening and the keyhole are aligned with respect to each other, plugging-in the shaft with the radial webs or the thread webs into the keyhole, rotating the bayonet connector about its longitudinal axis within the first opening and the keyhole and retaining, which may be clamping, the first and the second component between the head and the radial webs or the thread webs of the bayonet connector.

It is within the scope of the connection method that the first component may be provided with a bayonet connector which is pre-positioned in the first opening of the first component. The first and the second component may be first of all positioned in a stack-like arrangement such that the first opening in the first component is aligned with respect to the keyhole in the second component. Subsequently, the bayonet connector may be plugged through the first opening and the keyhole so that the bottom side of the head of the bayonet connector rests against the first component. As soon as the bayonet connector has been inserted into the first opening and the keyhole which are aligned to each other, a rotation of the bayonet connector about its longitudinal axis takes place. This rotation of the bayonet connector about its longitudinal axis may comprise a rotation angle smaller than 180° and may be at most 90°. With the help of this rotation, the radial webs are first of all positioned such that they are no longer aligned with the keyhole of the second component.

When using the bayonet connector with thread webs, the bayonet connector cannot be plugged into the keyhole of the second component. This is prevented due to the course of the thread webs. Accordingly, the bayonet connector is rotated already during the inserting or during the moving through the keyhole of the second component. This rotation direction may depend on whether the thread webs define a right-handed or a left-handed thread.

The connection method further comprises providing of the first component with the first opening in which the bayonet connector may be pre-positioned via at least one positioning web or a pre-positioning web at the head of the bayonet connector, or providing the first component with the first opening and the bayonet connector separately from each other and plugging-in the bayonet connector into the first opening in the stack-like arrangement of first and second component.

The bayonet connector of the first alternative may be equipped with a positioning web which guarantees a positioning of the bayonet connector in the first component opening. With reference to the second alternative of the bayonet connector, the pre-positioning webs are provided which, due to their arrangement at the head bottom side, guarantee a pre-positioning of the bayonet connector in the first component opening.

In this way, i.e. due to the rotation of the bayonet connector about its central longitudinal axis according to the different constructions of the bayonet connector, a form-fit connection between the bayonet connector and the at least two components is realized. The rotation of the bayonet connector may also serve for bringing the fastening means of the radial webs into interaction with the at least second component. This interaction is, for example, a locking of a fastening means, which is provided as a locking means, at the radial webs at the second component. In this way, and complementary to the above-described form-fit connection, which may be an additional force-fit connection between the bayonet connector and the at least two components is achieved.

Accordingly, the radial webs may include locking projections facing the head, which when rotating the bayonet connector each lock into a recess or an opening at the second component.

According to a further embodiment, the radial webs may include ramp slopes facing the head, which, when rotating the bayonet connector about its longitudinal axis, clamp the first and the second component between head and radial webs of the bayonet connector.

According to a further design, the above-described connection method comprises the further step: before the inserting of the shaft with the thread webs into the keyhole, searching the keyhole with the finder tip and aligning the bayonet connector with respect to the keyhole for the screwing-in.

According to a further design of the connection method, the finder tip which has already been described above may be used for the pre-positioning of the bayonet connector with thread webs. This finder tip is directed to the components to be connected, in a direction facing away from the head. As the finder tip firstly encounters the first component or the second component, the finder tip supports a plugging-in of the bayonet connector into the respective opening due to its small radial extension. Because for this pre-positioning or the first inserting of the finder tip into precisely the opening in the second component, it is in the first place not necessary that the thread webs are aligned in a fitted manner with respect to the radial openings of the keyhole or the radial slots. The finder tip stabilizes the bayonet connector in this position and thus facilitates the suitable orientating of the thread webs to the radial slots of the keyhole in the second component.

Within the scope of the connection method, the further step is that when rotating the bayonet connector, a screwing-in of the thread webs into the keyhole and a drawing-together of the first and the second component via a screw connection between the thread webs and the keyhole may take place.

It has furthermore proven advantageous that with the help of the provided steep thread, the thread webs screw the at least two components against the bottom side of the head of the bayonet connector. Because due to the thread webs and a suitable rotation of the bayonet connector about its longitudinal axis, a relative tensile stress is applied onto the at least two components to be connected with each other, so that they are pulled against the bottom side of the head of the bayonet connector. Analogously to that, it can certainly also be emphasized that due to the shape of the thread webs, the bayonet connector is drawn into the keyhole of the second component due to its rotation. Due to this construction of the bayonet connector, the installing insertion torque which may be transmissive on the bayonet connector, is converted into a mechanical axial force, which may press the at least two components in the connection to be established against each other.

4. BRIEF DESCRIPTION OF THE DRAWINGS

Figure 2:
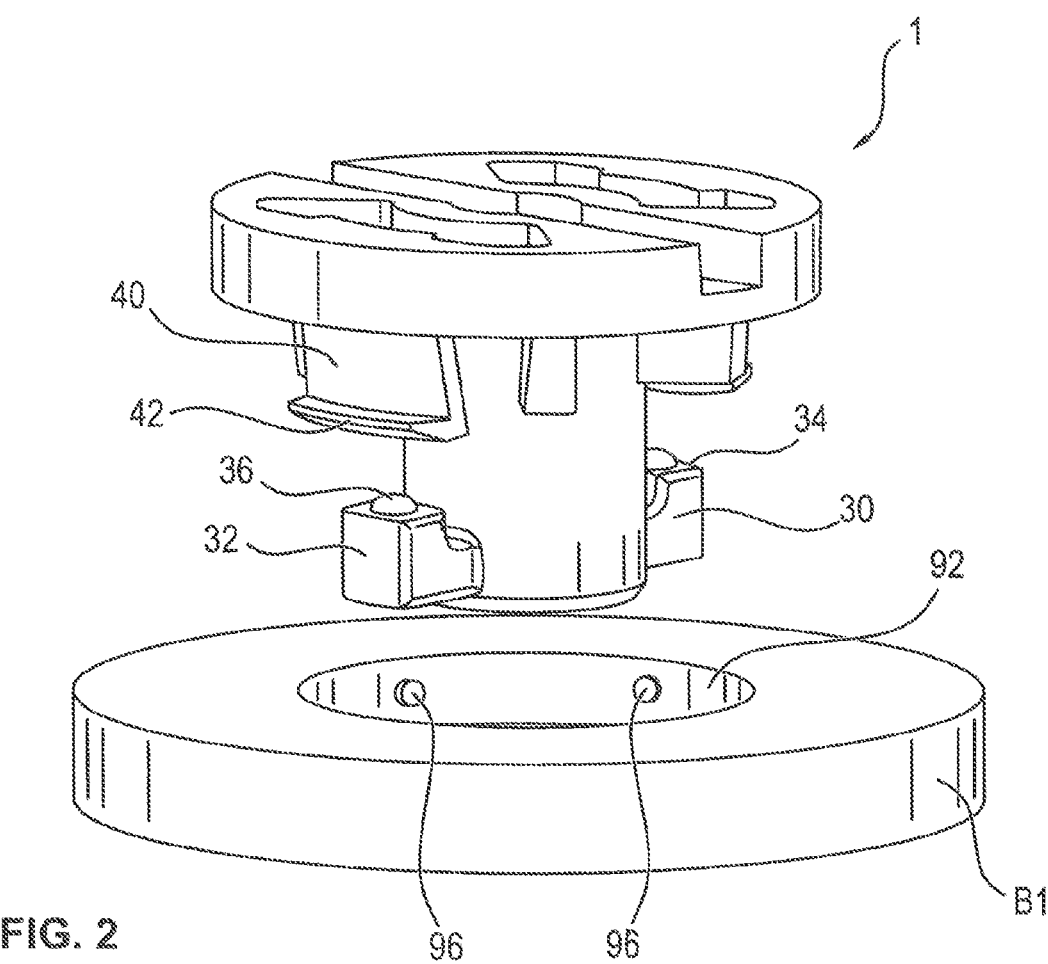
Figure 3:
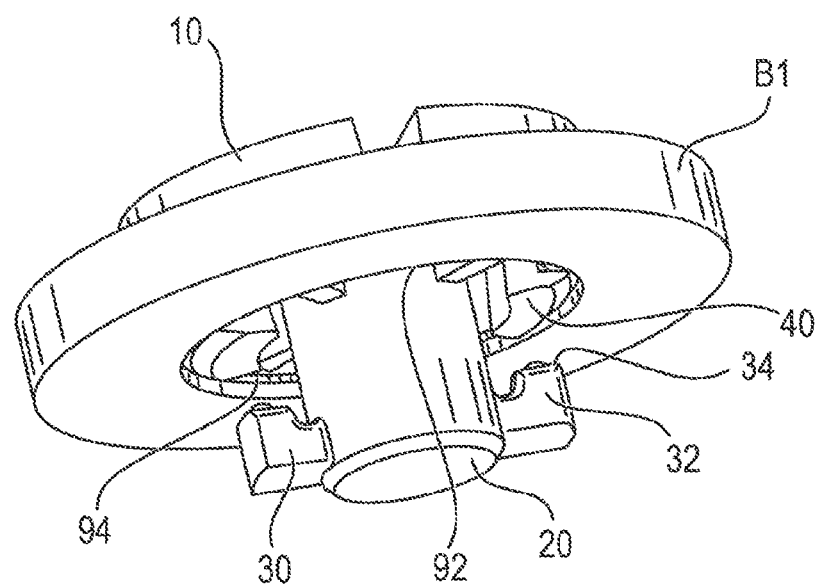
Figure 4:
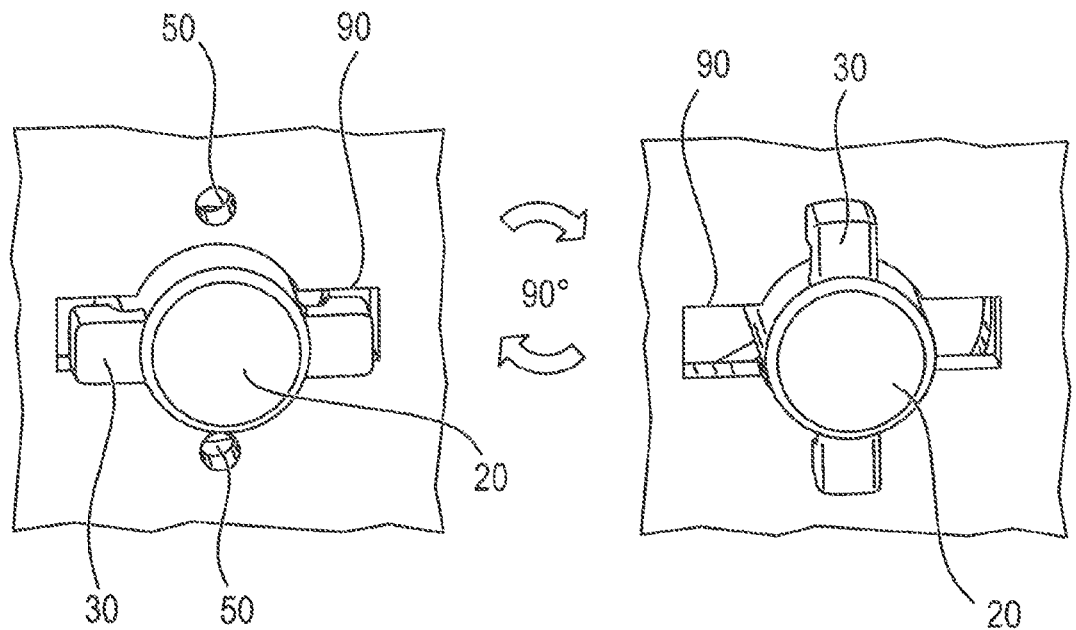
Figure 5:
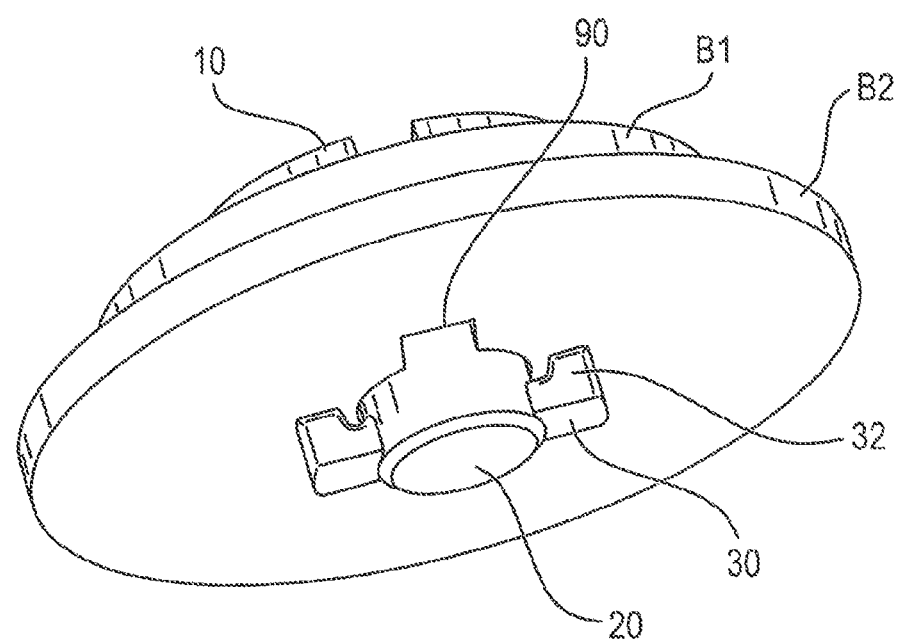
Figure 6:
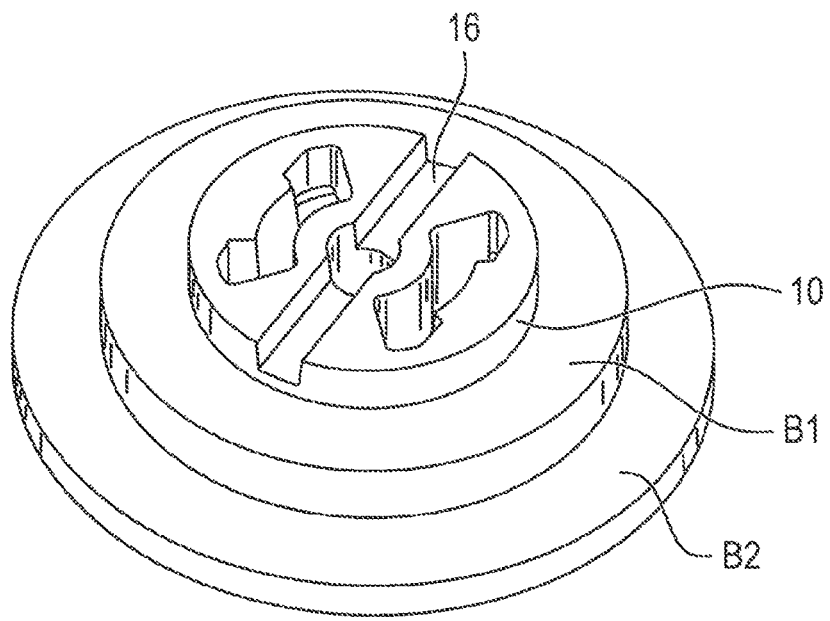
Figure 7:
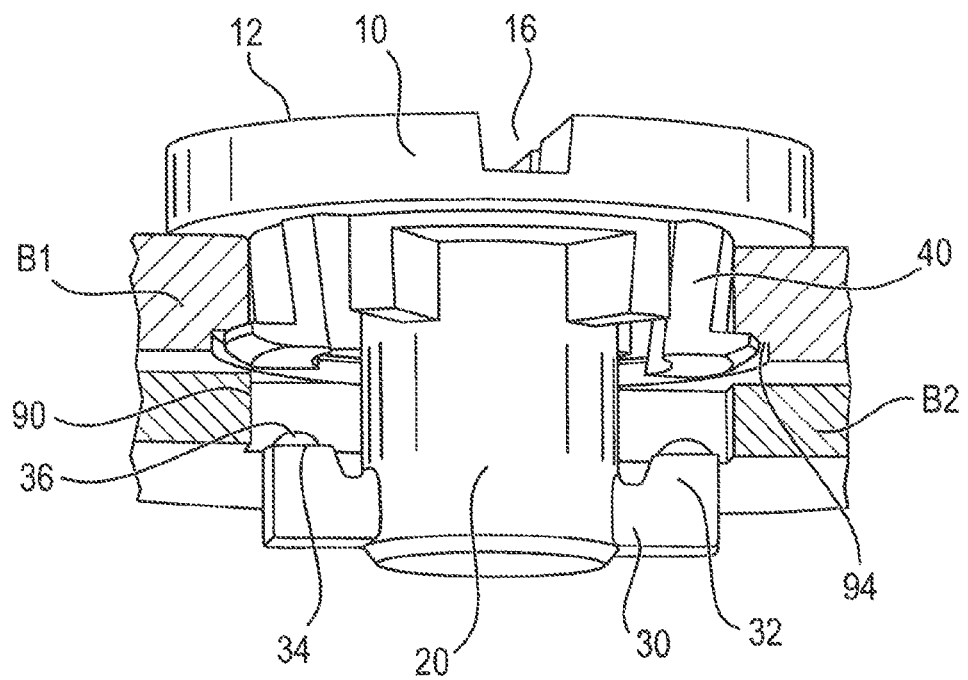
Figure 8:
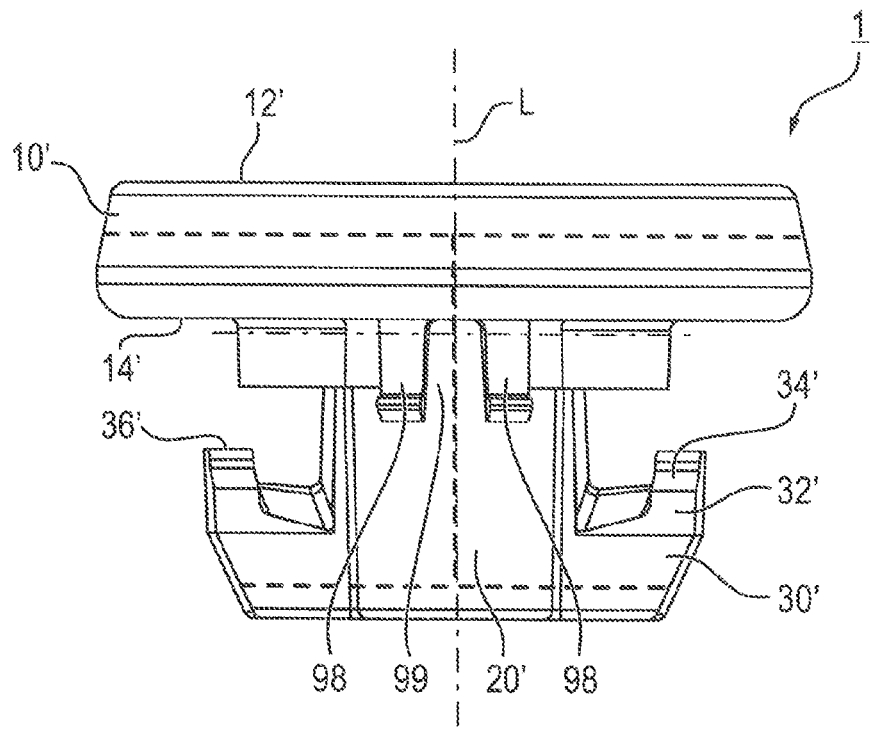
Figure 9:
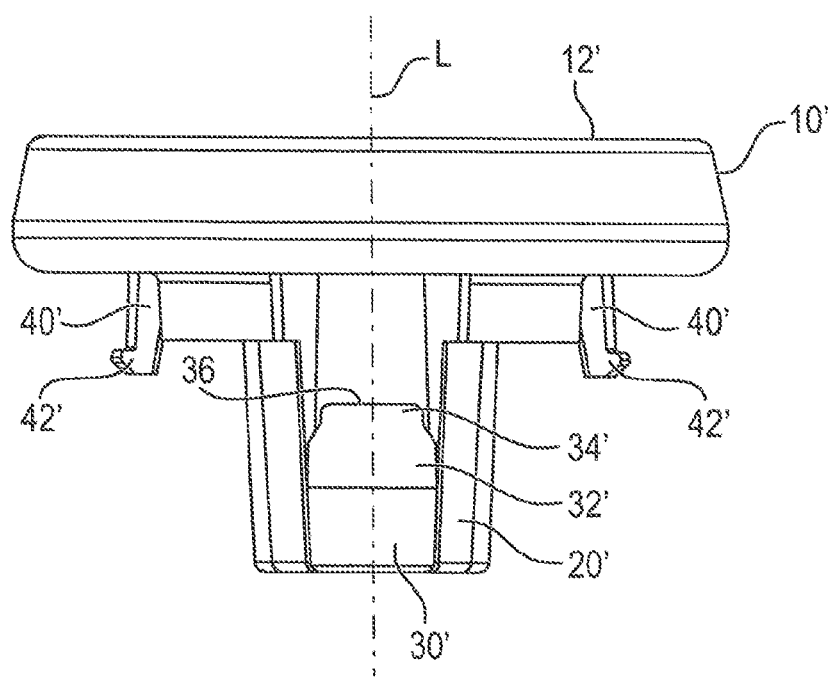
Figure 10:
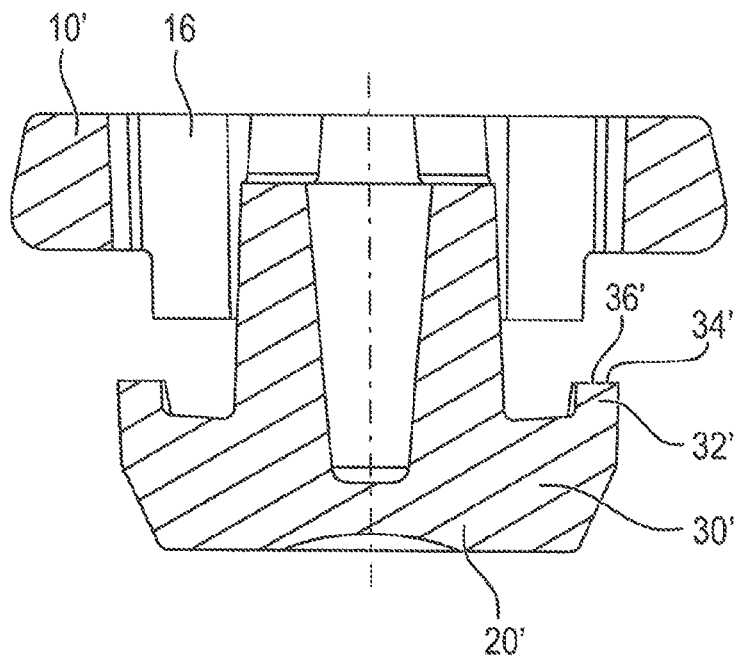
Figure 11:
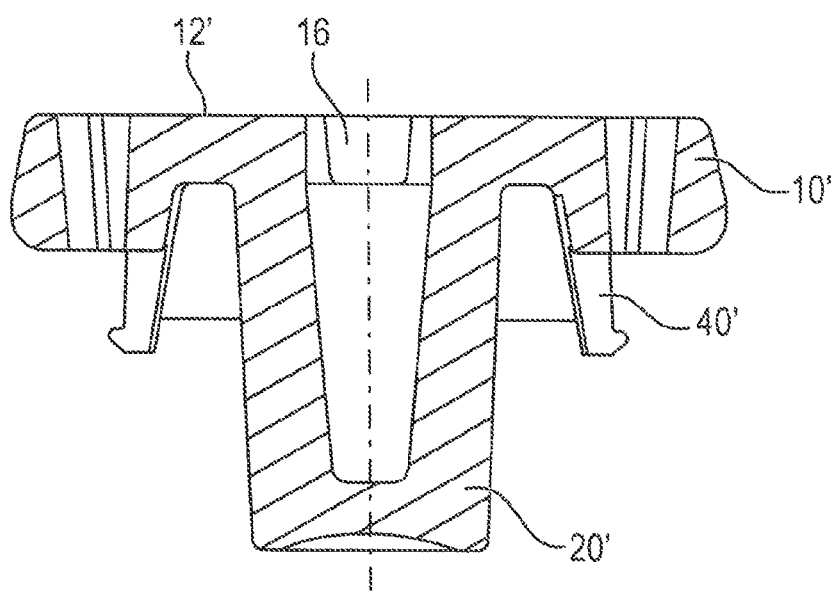
Figure 12:
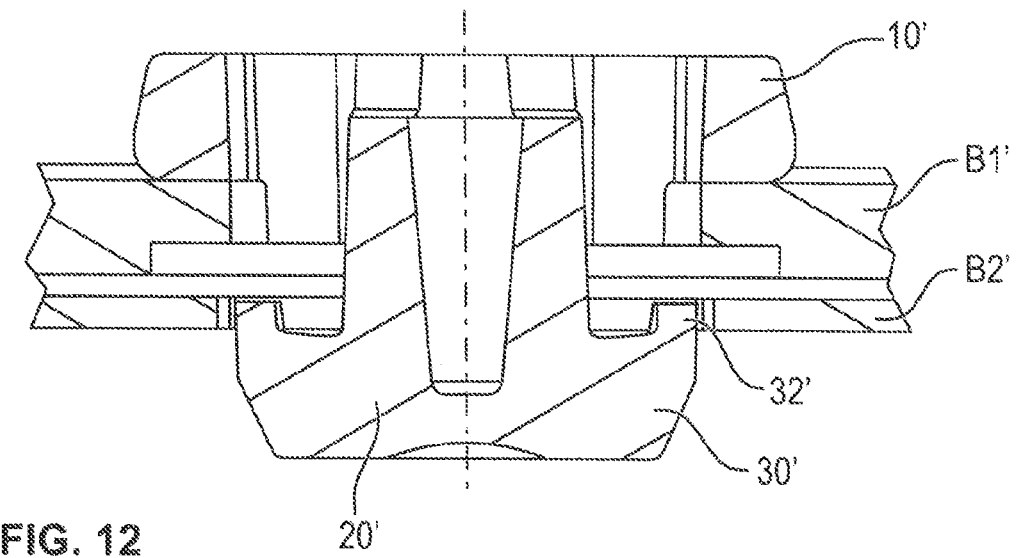
Figure 13:
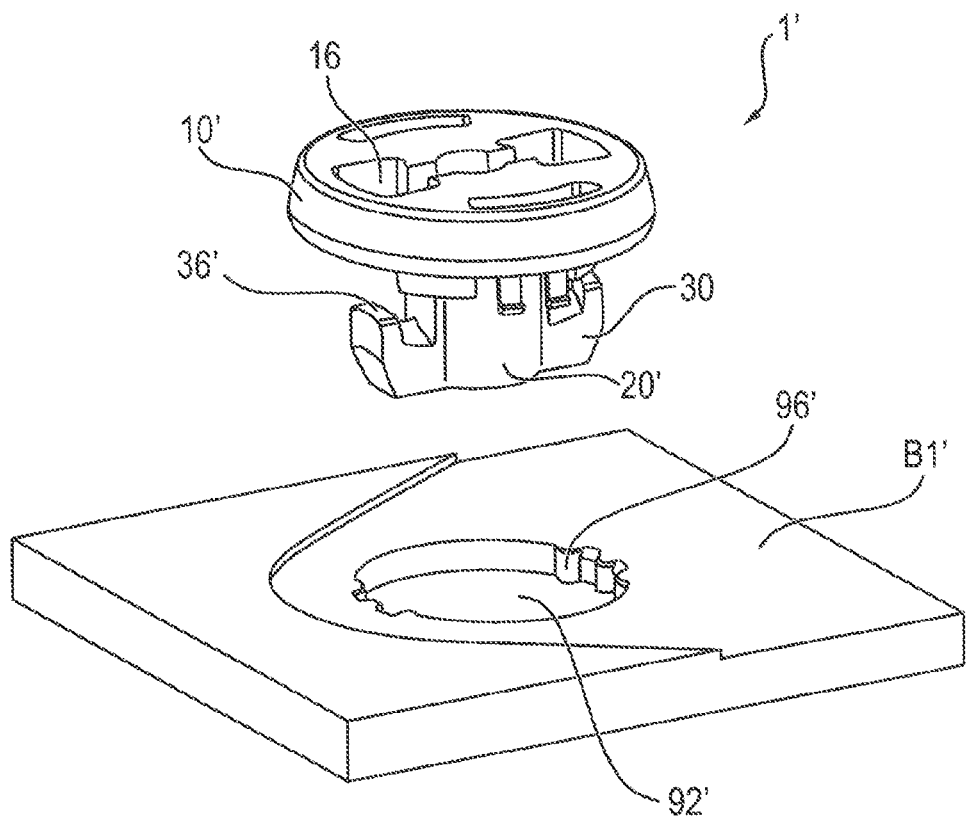
Figure 14:
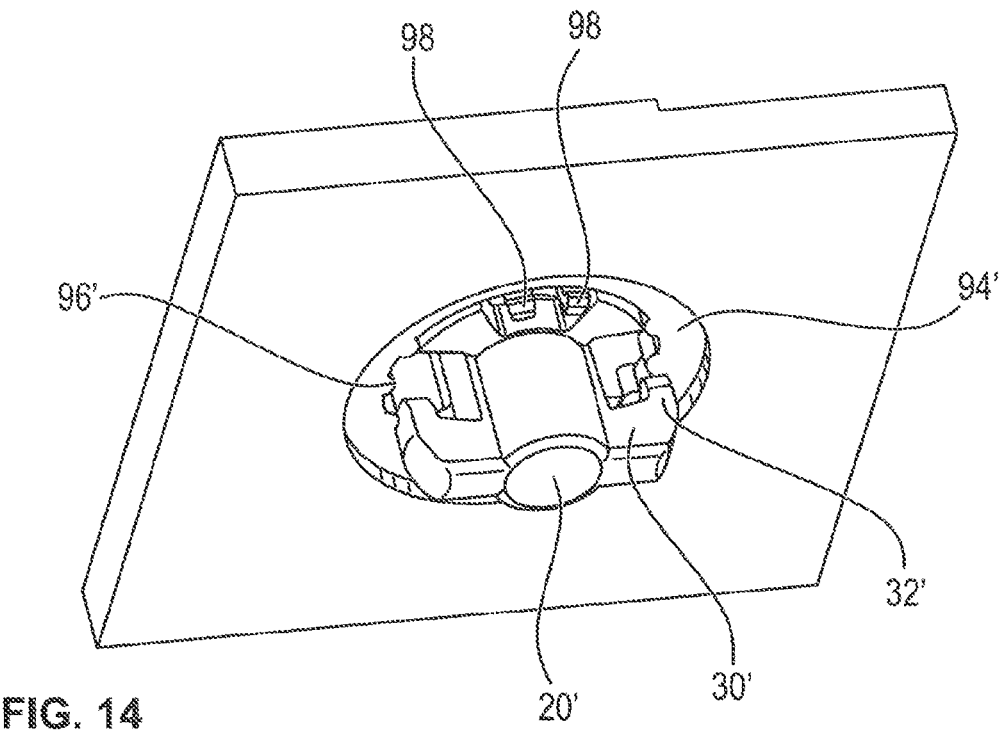
Figure 15:
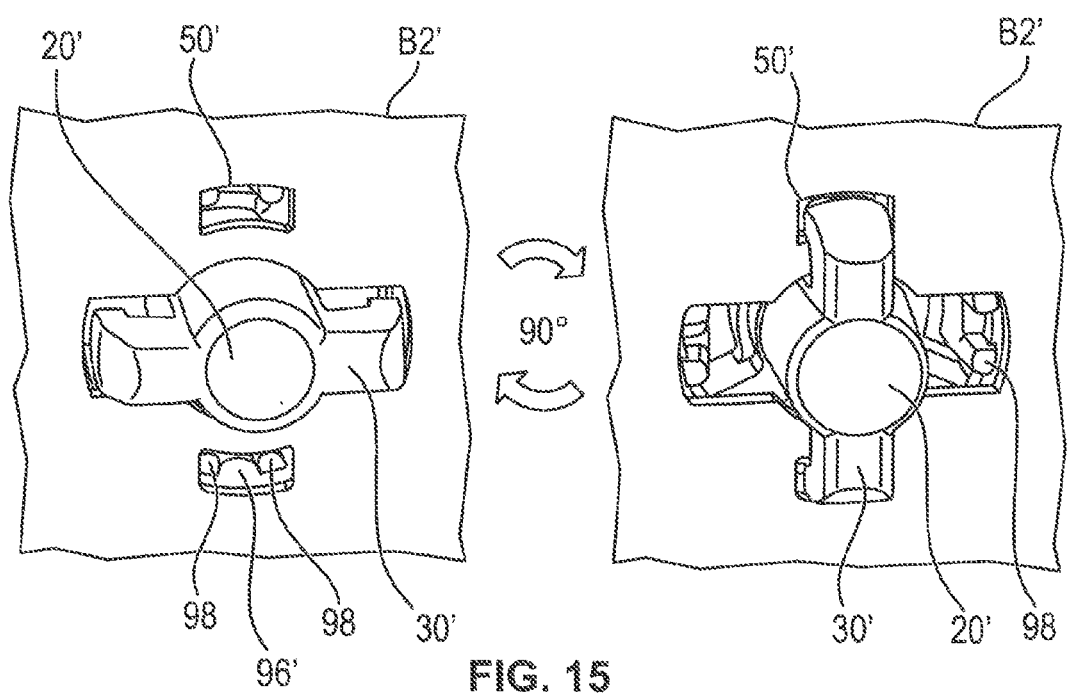
Figure 16:
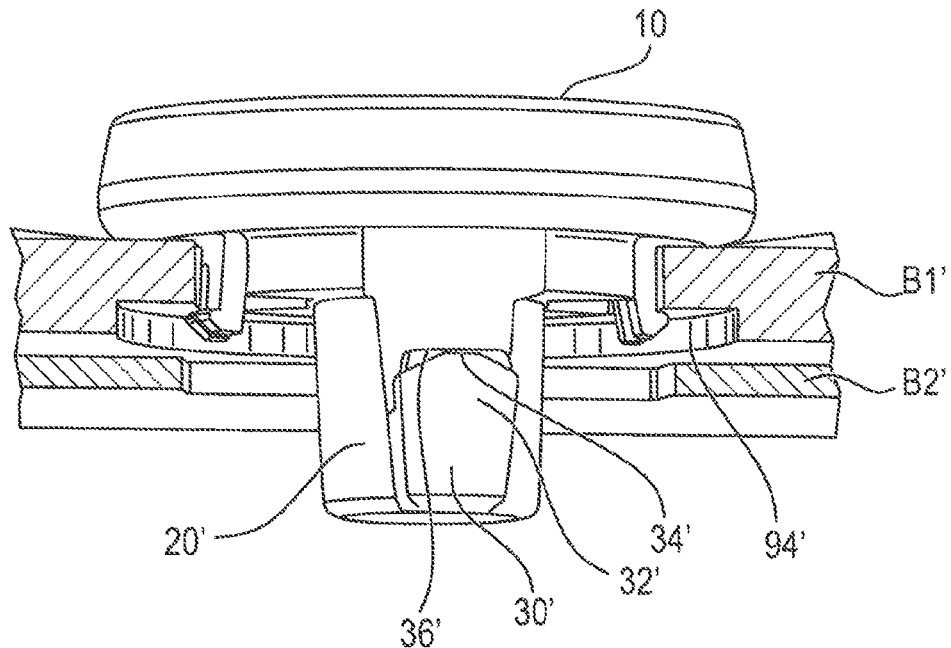
Figure 17:
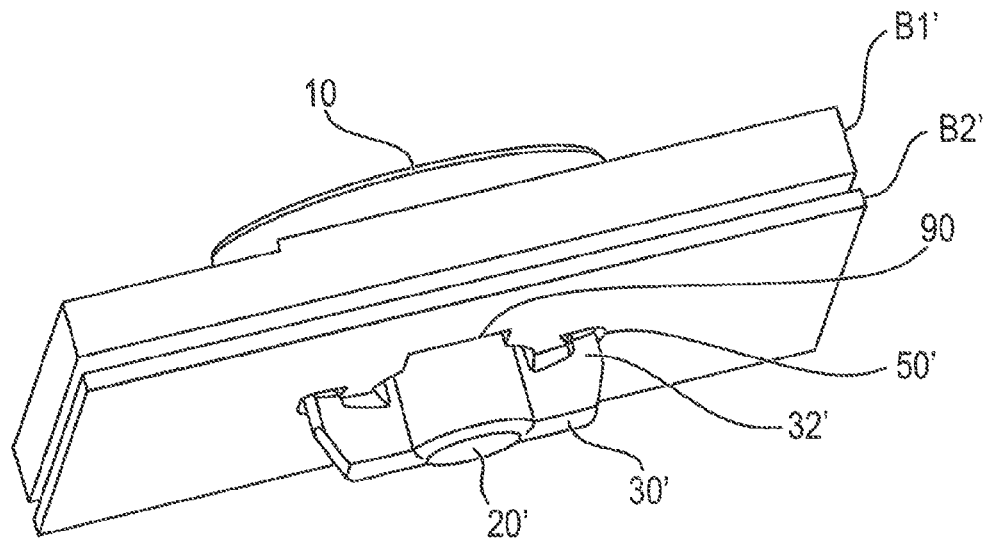
Figure 18:
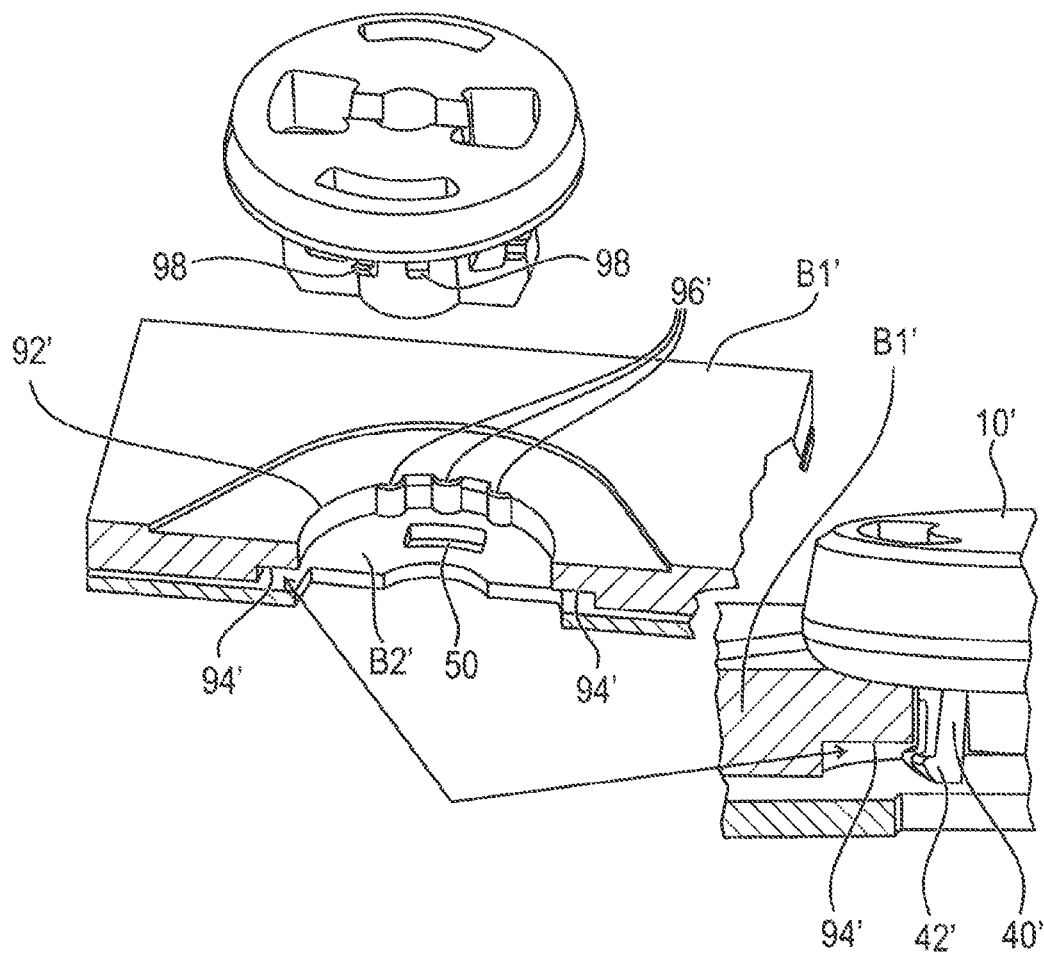
Figure 19:
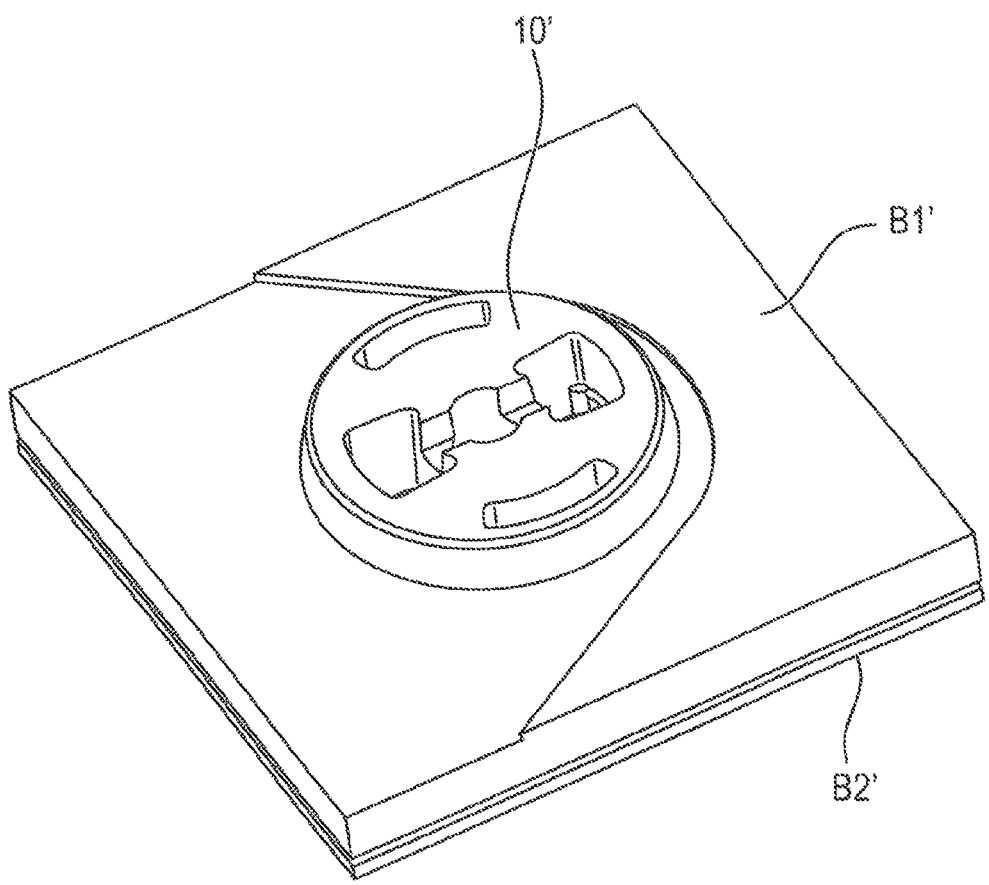
Figure 20:
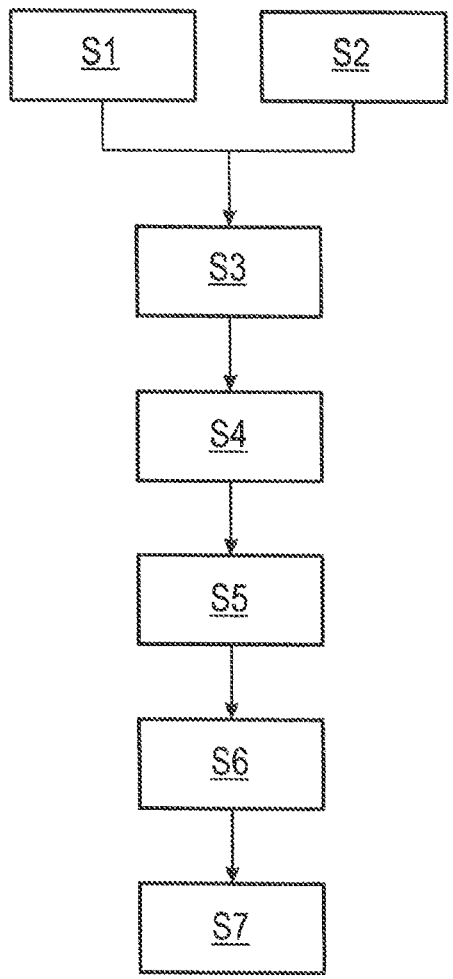
Figure 21:
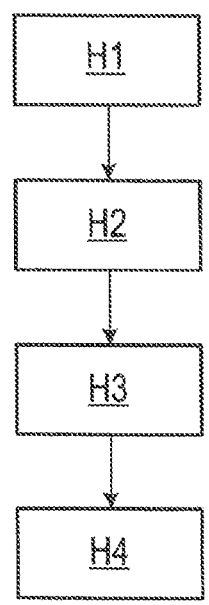
Figure 22:
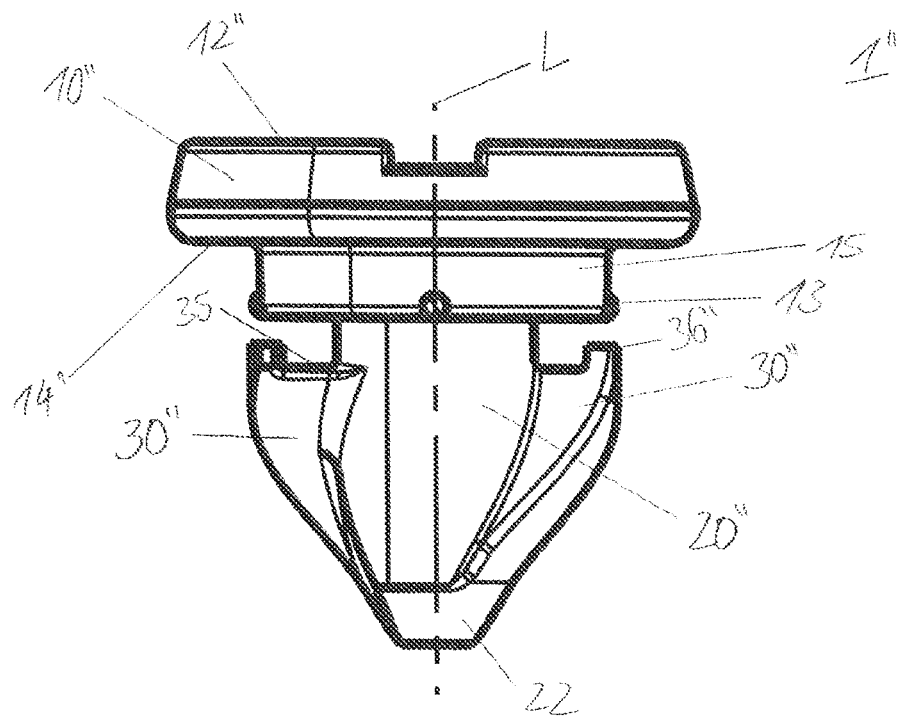
Figure 23:
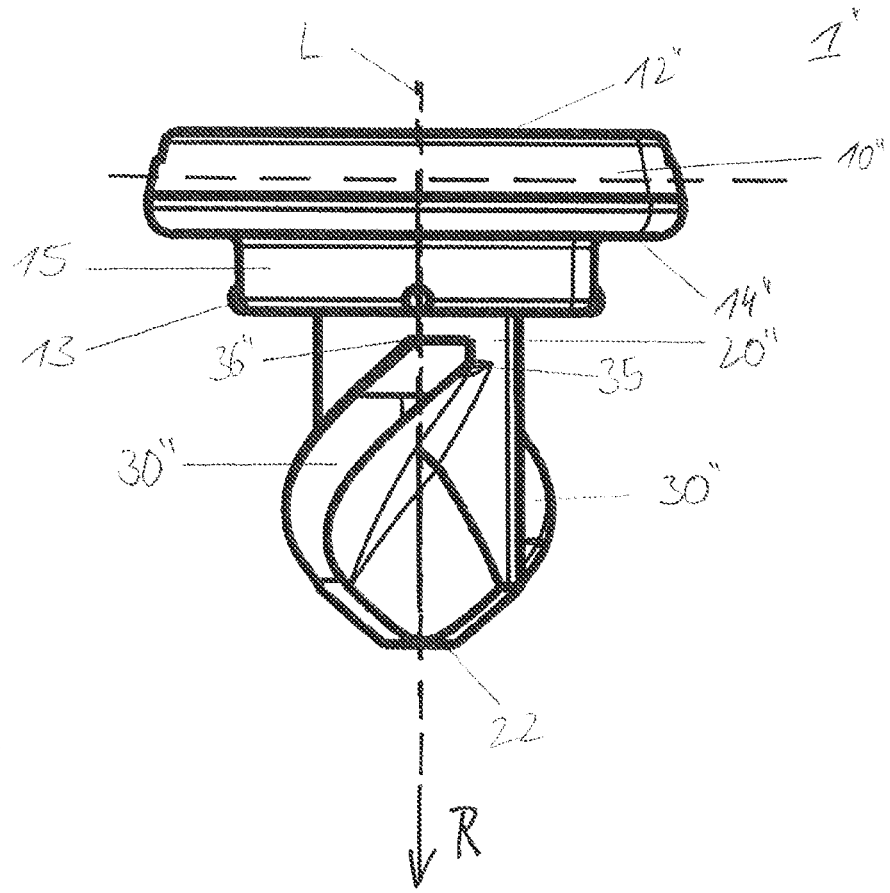
Figure 24:
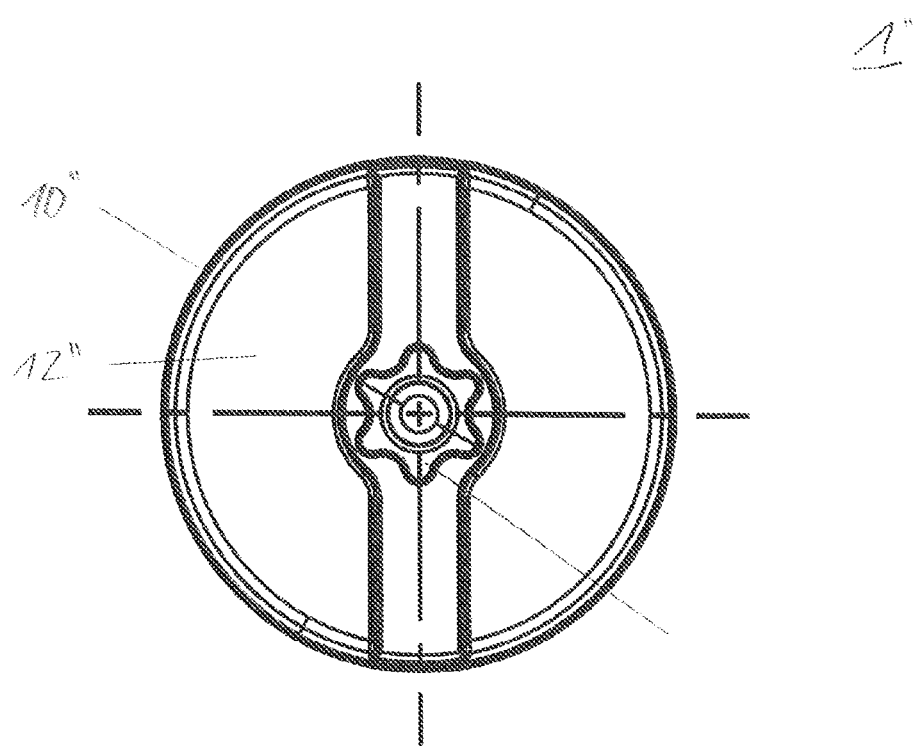
Figure 25:
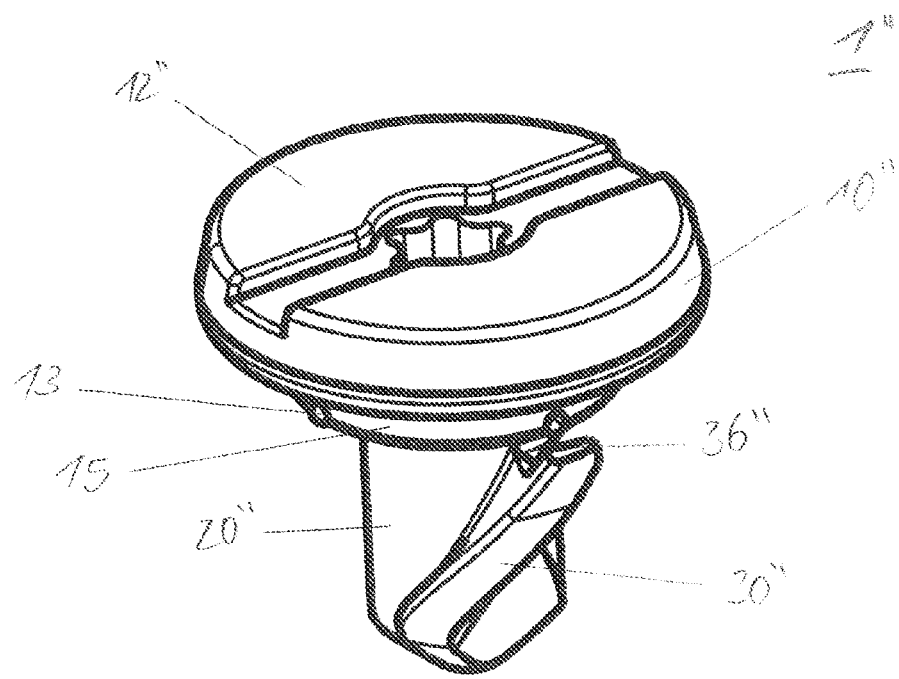
Figure 26:
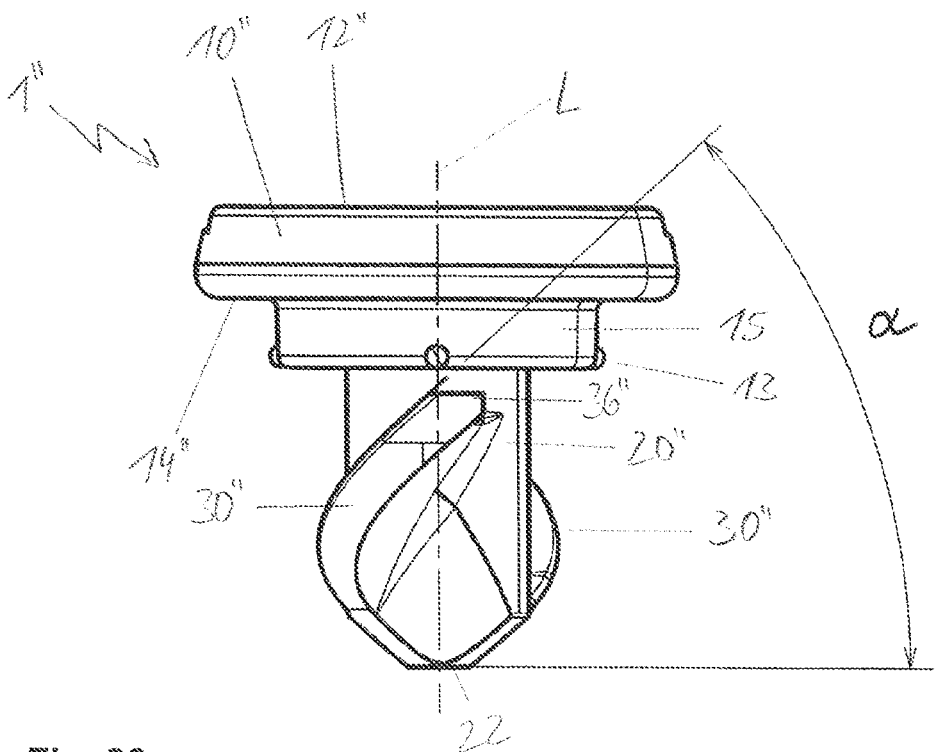
Figure 27:
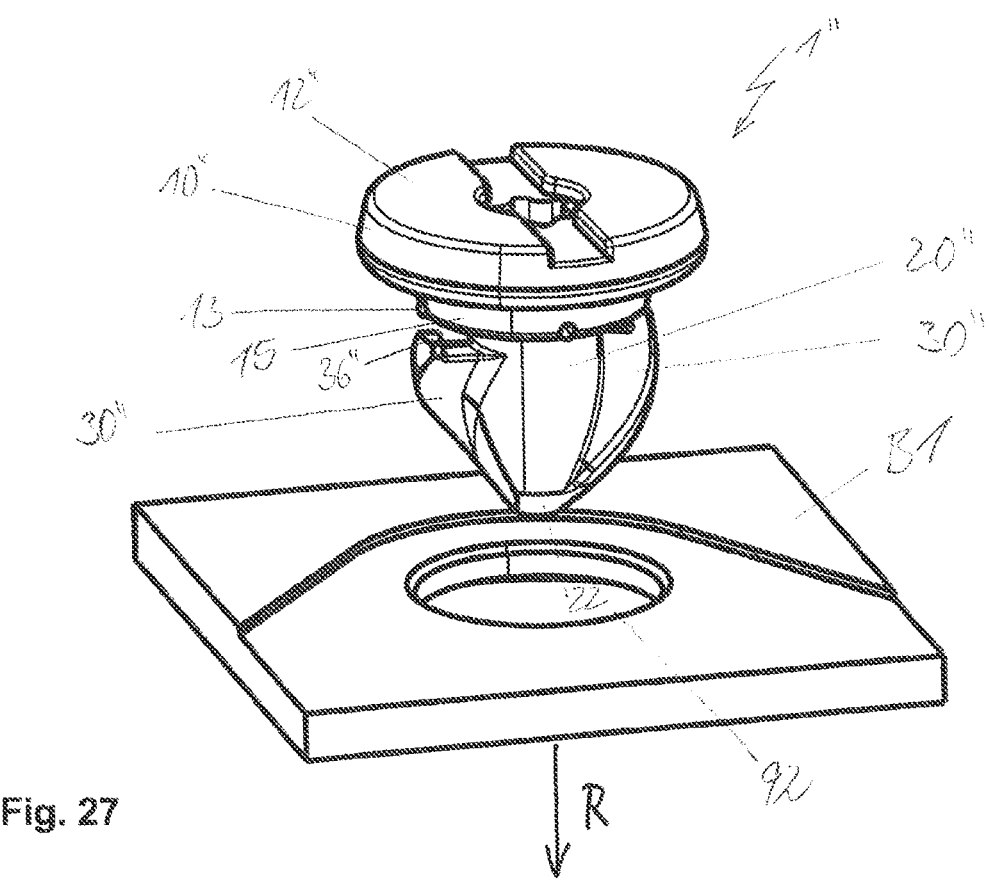
Figure 28:
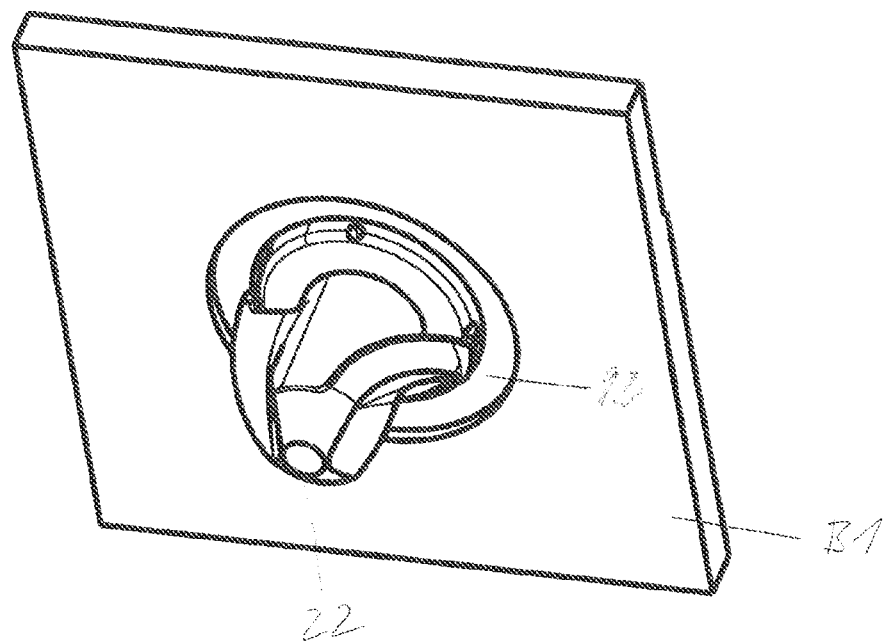
Figure 29:
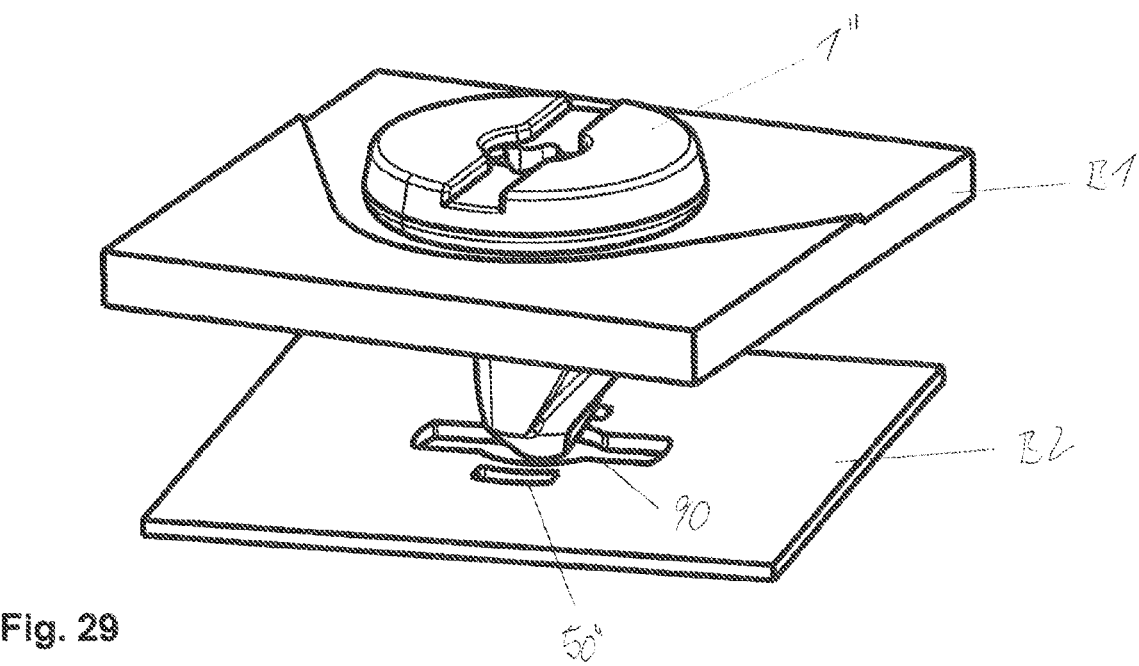
Figure 30:
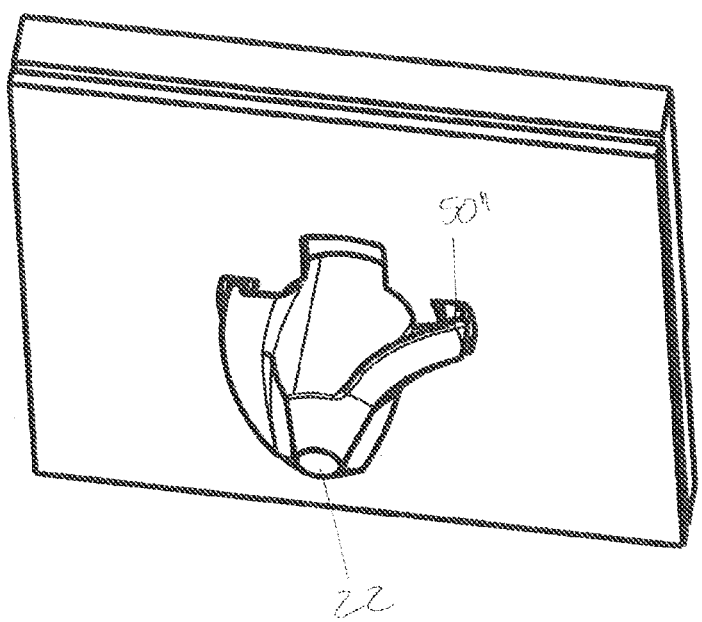
Figure 31:
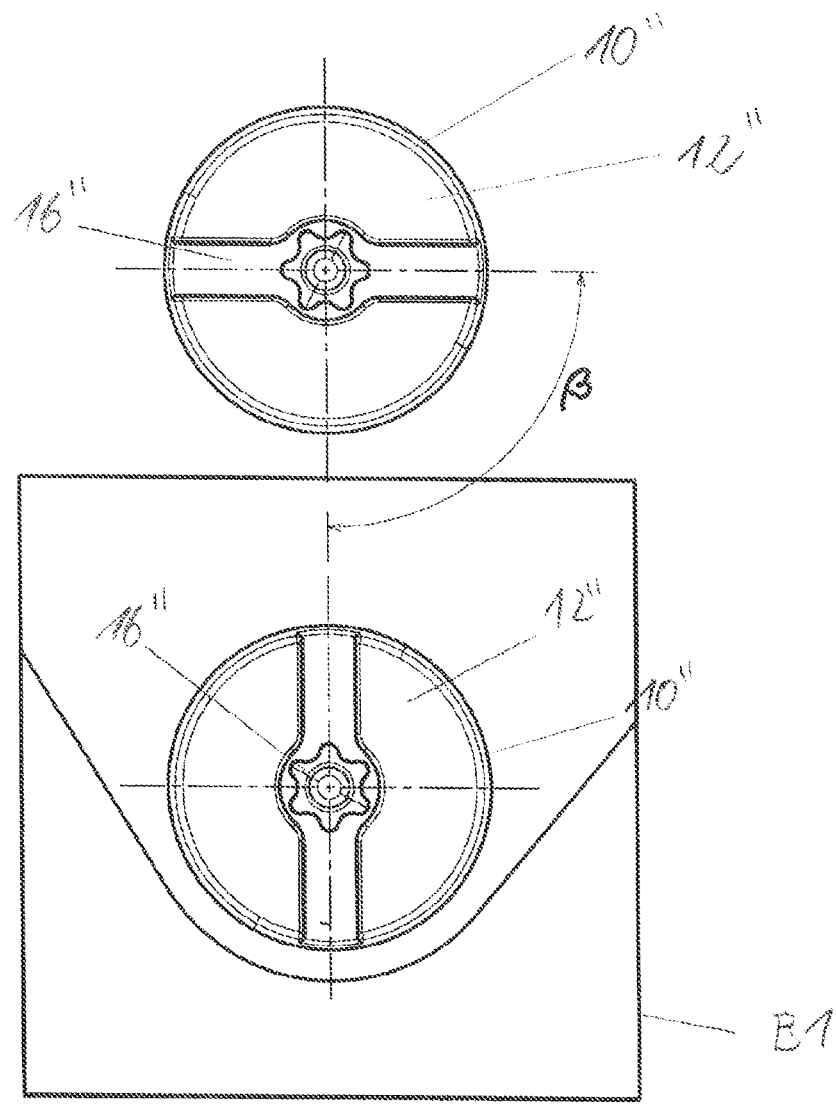

The embodiments of the present disclosure are described in more detail with reference to the accompanying drawings. It shows:

FIG. 1 a lateral view of a first embodiment of the bayonet connector,

FIG. 2 a perspective view of the bayonet connector according to FIG. 1 during inserting into the first opening of the first component, FIG. 3 the bayonet connector according to FIG. 1, inserted into the first opening of the first component, FIG. 4 an illustration of the fastening of the bayonet connector at the second component with the help of a rotation, FIG. 5 a perspective lateral view of the component composite consisting of the bayonet connector, the first component and a second component with a keyhole, FIG. 6 a perspective top view onto the component composite according to FIG. 5, FIG. 7 a partial lateral sectional view of the component composite according to FIG. 5, in which the bayonet connector is inserted into the first opening of the first component and is locked at the keyhole of the second component, FIG. 8 a lateral view of a further embodiment of the bayonet connector, FIG. 9 a further lateral view of the embodiment of the bayonet connector according to FIG. 8, FIG. 10 an axial sectional view of the embodiment of the bayonet connector according to FIG. 8, FIG. 11 an axial sectional view of the bayonet connector according to FIG. 9, FIG. 12 a lateral view of a component composite with the help of the bayonet connector according to FIG. 8, FIG. 13 a perspective view of the first component with the first opening and the bayonet connector according to FIG. 8, FIG. 14 a perspective view of the first component with the first opening into which the bayonet connector according to FIG. 8 is inserted, FIG. 15 an illustration of the fastening rotation movement of the bayonet connector according to FIG. 8, once it has been inserted into the keyhole of the second component, FIG. 16 a perspective lateral view of the component composite, consisting of the first component, the second component and the bayonet lock according to FIG. 8, FIG. 17 a perspective lateral view of the component composite consisting of the first component, the second component and the bayonet connector according to FIG. 8, FIG. 18 a perspective view of the bayonet connector according to FIG. 8 above the stack-like arrangement of first component and second component, in which the first opening is aligned to the keyhole of the second component, FIG. 19 a perspective view of the component composite consisting of the first component, the second component and the bayonet connector according to FIG. 8 inserted therein, in a perspective view lateral from above, FIG. 20 a flow chart of an embodiment of the connection method, FIG. 21 a flow chart of an embodiment of the manufacturing method of the bayonet connector, FIG. 22 a lateral view of an embodiment of a further alternative of the bayonet connector, FIG. 23 a further lateral view of the bayonet connector according to FIG. 22, FIG. 24 a top view onto the head of the bayonet connector according to FIG. 22 according to a further design, FIG. 25 a perspective lateral view of the bayonet connector according to FIG. 22, FIG. 26 an illustration of a pitch angle for characterizing the course of the thread webs of the bayonet connector according to FIG. 22, FIG. 27 a perspective lateral view of the bayonet connector according to FIG. 22 before its inserting into the first component opening of the first component, FIG. 28 a view of the second component with component opening, into which the bayonet connector according to FIG. 22 has been inserted and been locked there in a form-fit and/or force-fit manner, FIG. 29 the bayonet connector according to FIG. 22 inserted into the component opening of the first component in alignment with the keyhole in the second component, wherein the finder tip of the bayonet connector has found the central opening of the keyhole in the second component or is aligned to it, respectively, FIG. 30 a connection between the first and the second component with a bayonet connector according to FIG. 22 and viewed from a bottom side of the second component, at which the shaft with thread webs projects from the keyhole, and FIG. 31 an illustration of the rotation angle β in order to connect the at least two components with thread webs with each other with the help of the bayonet connector.

5. DETAILED DESCRIPTION

FIG. 1 as well as 8 and 9 show the different embodiments of the bayonet connector 1; 1'. Each consists of a head 10; 10' with a head upper side 12; 12' and a head bottom side 14; 14'. From the head bottom side 14; 14', a shaft 20; 20' extends in central position with respect to a face of the head bottom side 14; 14'. From the shaft 20; 20', two radial webs 30; 30' extend in radial direction. The two radial webs 30; 30' may be arranged opposite to each other, i.e. diametrically to each other.

The radial webs 30; 30' serve for the engagement into a keyhole 90. The keyhole 90 is provided in the second component B2. By a rotating of the bayonet connector 1; 1' in the keyhole 90, the radial webs 30; 30' are aligned dissimilarly to the keyhole 90 so that a form-fit connection between the bayonet connector 1; 1' and the second component B2 arises.

The form-fit connection between the bayonet connector 1; 1' and the second component B2 with keyhole 90 can be realised with differently configured radial webs 30; 30'. This is explained in more detail below.

Based on the arrangement of the head 10; 10', shaft 20; 20' and radial webs 30; 30', it can exemplary be seen in FIGS. 1 and 8 that the bayonet connector 1; 1' is characterized by a double-T-like structure. The double-T-like structure is highlighted with a dashed line in FIGS. 1 and 8. In there, the connecting transverse axis between the two legs runs parallel to the longitudinal axis L of the bayonet connector 1; 1'.

FIGS. 2 and 13 each show the bayonet connector 1; 1' in front of the first opening 92; 92' of the first component B1. The first opening 92; 92' is chosen just big enough that the bayonet connector 1; 1' with the radial webs 30; 30' can be plugged into the first opening 92; 92'. Accordingly, the shaft 20; 20' then runs through the first opening 92; 92', as is shown in FIGS. 3 and 14.

A length of the radial webs 30; 30' may be adjusted such that a length of the two radial webs 30; 30' in combination with a shaft diameter of the shaft 20; 20' is smaller than an outer diameter of the head 10; 10'. This length configuration of the radial webs 30; 30' in comparison with the diameter of the head 10 becomes apparent in FIGS. 1 and 8, too.

The combined length of the radial webs 30; 30' with shaft 20; 20' may be smaller than the outer diameter of the head

10; 10'. The inner diameter of the first opening 92; 92' may be bigger than the combined length of the radial webs 30; 30' with shaft 20; 20' but smaller than the outer diameter of the head 10; 10'. In this way, it is guaranteed that the bayonet connector 1; 1' can be plugged through the first opening 92; 92' and the head 10; 10' subsequently rests at the first component B1 (see FIGS. 3 and 14).

At least one positioning web 40; 40', which may be a plurality of positioning webs 40; 40', extends from the head bottom side 14; 14'. According to the embodiment of FIG. 1 as well as 8 and 9, two positioning webs 40; 40' which are arranged opposite to each other are provided at the bayonet connector 1; 1'.

The positioning webs 40; 40' extend in the direction of the shaft 20; 20' from the head bottom side 14; 14'. On the one hand, the positioning webs 40; 40' are arranged radially outwardly from the shaft 20; 20 in a spaced manner. The intermediate space between the positioning webs 40; 40' and the shaft 20; 20' may enable a radially inwardly springing of the positioning webs 40; 40'. Furthermore, the positioning webs 40; 40' may be arranged radially inwardly spaced to the outer circumferential face of the head 10; 10'. This position guarantees that the positioning webs 40; 40' are within the first opening 92; 92' after the bayonet connector 1; 1' has been inserted into the first opening 92; 92'.

The positioning web 40; 40' may include an axial undercut at a radial outer side. According to a further embodiment, the axial undercut is formed by a locking hook 42; 42' which is directed radially outwardly. The positioning webs 40; 40' may be arranged at the head bottom side 14; 14' such that they retain the bayonet connector 1; 1' within the first opening 92; 92' in a pre-position. Accordingly, a distance of the radial outer sides of two positioning webs 40; 40' which are arranged opposite to each other may be as big as an inner diameter of the first opening 92; 92'.

If the bayonet connector 1; 1' is inserted into the first opening 92; 92', the axial undercut of the locking hook 42; 42' may engage at the side of the first component B1, which faces away from the head 10; 10'. In this way, the bayonet connector 1; 1' retains in the first opening 92; 92'. Because the first component B1, in particular the edge of the first component 92; 92' may be held between the axial undercut of the locking hook 42; 42' and the bottom side 14; 14' of the head 10; 10'. In this context, the shaft 20; 20' projects over the first component B1; B1' with the radial webs 30; 30' below the first opening 92; 92'.

At the first opening 92; 92', a partial or complete circumferential clearance 94; 94' may be provided at a component side facing away from the head, i.e. one-sided at the first component B1 and facing away from the head 10; 10' of the bayonet connector 1; 1'. The clearance 94; 94' reduces the thickness of the first component B1 in the edge portion of the first opening 92; 92'. Furthermore, the clearance 94; 94' may have a radial depth of sufficient size in order to guarantee an engagement and a locking of the locking hook 42; 42' in the clearance 94; 94'.

According to a further embodiment, at a radial inner side of the first opening 92; 92', at least one radially inwardly projecting projection 96, or at least two projections 96, may be provided. The projections 96 serve as a stop for the positioning webs 40 in order to avoid a rotation of the bayonet connector 1 in the first opening 92 (see FIG. 2).

A further embodiment provides a plurality of radial projections 96' at the radial inner side of the first opening 92'. Only one radial projection 96' at the inner side of the first opening 92' in order to support a positioning of the bayonet connector 1; 1' in the first opening 92; 92' may be arranged.

The radial projections 96' interact with a design of the positioning web 40'. The positioning web 40' may be configured fork-like with at least two prong-like locking hooks 98 separated by an intermediate space 99 (see FIGS. 8, 15 and 18).

When the bayonet connector 1' has been inserted into the opening 92', the locking hook of the positioning web 98 locks in the clearance 94'. In order to retain the bayonet connector 1' in a defined pre-position for the later assembly, the bayonet connector 1' is rotated about its longitudinal axis L within the first opening 92'. The rotation may be carried out so far until one of the projections 96' snaps between the locking hooks 98, i.e. in the intermediate space 99. By that, the pre-position of the bayonet connector 1' with regard to the first opening 92' is fixed in an adjustable and releasable manner.

In order to connect the first component B1; BF and the second component B2; B2' with each other with the help of the bayonet connector 1; 1', firstly, both components B1; BF and B2; B2' are arranged upon each other in a stack-like manner. The arrangement of the components B1; B1', B2; B2' is such that the first opening 92; 92' is positioned over the keyhole 90.

According to a first connection alternative, the bayonet connector 1; 1' is pre-positioned in the first opening 92; 92', as has been described above (step S1). According to a second alternative, firstly, the two components B1, B2; B1', B2' are arranged upon each other (step S2). Subsequently, the bayonet connector 1; 1' is plugged through the first opening 92; 92' and the keyhole 90 of the stack-like arrangement of the components B1, B2; B1', B2' (step S4).

In this arrangement, the shaft 20; 20' passes the first opening 92; 92' and the keyhole 90, as is shown in FIGS. 4, 5, 7 and 14, 15, 17. The bayonet connector 1; 1' is rotated about its longitudinal axis within the first opening 92; 92' and the keyhole 90 (step S6). In this way, the radial webs 30; 30' are rotated out of the symmetrical alignment to the keyhole 90 and clamp or retain the components B1, B2; B1', B2' between the head 10; 10' and the radial webs 30; 30' (step S7).

In order to establish this clamping or fastening of the components B1, B2; B1', B2', the radial webs 30; 30' may be configured rigid. In this way, they do not yield and do reliably fix the components B1, B2; B1', B2' when the bayonet connector 1; 1' is rotated in the first opening 92; 92' and in the keyhole 90.

In order to provide the above connection, the radial webs 30 are configured in the form of an L according to a first embodiment, as is shown in FIG. 1. A fastening means 36 is provided at a face side 34, which faces the head 10, of the shorter L leg 32. The fastening means 36 is a projection, which may be in the form of a hemisphere. This projection 36 interacts with a suitable recess or an opening 50, which is provided adjacent to the keyhole 90 in the second component B2 (see FIG. 4).

As when being rotated, the radial webs 30 may be mechanically pre-tensioned against the second component B2, the fastening means 36, which may be the hemisphere, releasably locks into the opening or recess 50. By that, the bayonet connector 1 is secured in this position. Furthermore, a force-fit connection may be realized besides the form-fit connection.

In order to release the connection between the components B1, B2 and the bayonet connector 1, the radial webs 30 are unlocked from the opening 50 and rotated in alignment with the keyhole 90. The rotation can take place in any desired direction. Subsequently, the bayonet connector 1 is removed from the keyhole 90 and the first opening 92 of the first component B1.

With regard to the radial webs 30, they may be constructed beam-like, i.e. without a shorter L-leg 32. In this configuration, the fastening means 36 would sit on the beam-like radial web 30 directly and face the head 10.

According to a further design, the fastening means 36 may consist of a radially extending locking web or a locking lip (not shown). Instead of the recess or the opening 50, two further locking lips or locking edges or a locking recess are provided in the surface of component B2; B2', into which the locking lip of the radial web 30 can engage.

With this choice of the fastening means 36, too, the bayonet connector 1 may be rotated by 90° out of the alignment with the keyhole 90 in order to be fastened. A releasing of the bayonet connector 1 takes place in the same or opposite rotation direction of the bayonet connector 1, as is shown in FIG. 4.

A further embodiment of the L-shaped radial webs 30' is shown in FIGS. 8 to 17. The L-shaped radial web 30' may consist of a shorter L-leg 32' with a face side 34'. A locking web or locking projection 36' projecting in the direction of the head 10' is provided on this face side 34. This locking projection or locking web 36' is adapted in order to engage or lock into a suitable recess or opening 50' adjacent to the keyhole 90.

According to FIGS. 4 and 15, the recesses or openings 50; 50' may be arranged in pairs opposite to one another. The recesses or openings 50; 50' may be provided in an offset manner by 90° to the alignment of the keyhole 90. In this connection, the recesses or openings 50; 50' may be arranged in a non-rectangular or non-rectangular alignment with respect to the keyhole 90 (not shown).

According to a further design of the fastening means 36; 36', it may be formed by a slope ramp (not shown). The slope ramp includes an abutment face for abutting at the second component B2, which is arranged not parallel, i.e. inclined to the second component B2.

According to a further design, the at least one positioning web 40 and the radial web 30 may be arranged in the same angle orientation with respect to the shaft 20 (see FIGS. 1 and 2). According to a further design, the radial webs 30' are provided at the shaft 20 in an offset manner by 90° with respect to the positioning webs 40'. With the same connection qualities compared with the design which was mentioned first, the latter design has the advantage that a manufacturing effort in the injection moulding with plastic materials and in the metal die casting with metals is lower. Specifically, with both manufacturing routs, the tool configuration is easier than for the bayonet connector 1 according to the design mentioned first.

A connection consisting of at least the first component B1; B1' and the second component B2; B2' is shown in FIGS. 5 to 7 and 17. According to a further design, the second component B2; B2' is a door frame of a motor vehicle and the first component B1; B1' may be an aggregate carrier for a motor vehicle door. In an aggregate carrier, such as a motorized window lifter, a loudspeaker, electric circuit elements for that and the like are arranged. For the fastening of the aggregate carrier in the door frame, the bayonet connector 1; 1' may be fastened in a pre-positioned manner in an opening of the aggregate carrier.

According to a further design, the head 10; 10' comprises at least one opening 16; 16' at its upper side 12; 12'. The opening 16; 16' serves as a drive means in order to rotate the bayonet connector 1; 1'. The at least one opening 16; 16' or at least one additional opening may serve as an engagement contour for a robot in order to deliver the bayonet connector 1; 1' with a pick-and-place operation to the first component B1; B1'.

FIGS. 22 to 31 show an alternative design of the bayonet connector 1". The use of the same reference signs in the following description emphasizes that similar features are concerned which were already described above. Therefore, the above-mentioned details regarding the features apply in the same way to the further designs of the bayonet connector 1", too.

The bayonet connector 1" respectively consists of a head 10" with a head upper side 12" and a head bottom side 14". A shaft 20" extends from the head bottom side 14" in central position with respect to a face of the head bottom side 14". Two thread webs 30" extend from the shaft 20" in radial direction. The two thread webs 30" are arranged opposite one another, are configured rigid and may be limited to two.

The thread webs 30" serve for the engagement into the keyhole 90 in the second component B2. By a rotating of the bayonet connector 1" in the keyhole 90, the thread webs 30" are aligned unequally to the keyhole 90 so that a form-fit connection between the bayonet connector 1" and the second component B2 arises.

Based on the arrangement of head 10", shaft 20" and thread webs 30", it can exemplary be seen based on FIGS. 22 to 27 that the bayonet connector 1" is characterized by a T-like structure. The T structure is emphasized in FIG. 23 with a dashed line. A leg of the T structure runs parallel to the longitudinal axis L of the bayonet connector 1" in there.

FIG. 27 shows the bayonet connector 1" in front of the first opening 92 of the first component B1. The first opening 92 is chosen just as big that the bayonet connector 1" with the thread webs 30" can be plugged into the first opening 92. Accordingly, the shaft 20" then passes through the first opening 92, as is shown in FIGS. 28 and 29.

A radial width of the thread webs 30" may be adjusted such that a radial width of the two thread webs 30" in combination with a shaft diameter of the shaft 20" is smaller than an outer diameter of the head 10". This length configuration of the thread webs 30" in comparison with the diameter of the head 10" also becomes clear in FIGS. 22 and 27.

The combined radial width of the thread webs 30" with shaft 20" may be smaller than the outer diameter of the head 10". The inner diameter of the first opening 92 may be bigger than the combined radial width of the thread webs 30" with shaft 20" but smaller than the outer diameter of the head 10". In this way, it is guaranteed that the bayonet connector 1" can be plugged through the first opening 92 and that subsequently, the head 10" rests at the first component B1 (see FIGS. 28, 29 and 31).

The thread webs 30" of the bayonet connector 1" are characterized by a helical course. This helical course of the two thread webs 30" may define a steep thread. The steep thread is characterized by the fact that with a relatively small rotation of the bayonet connector 1" about its longitudinal axis L, a relatively big axial displacement of the bayonet connector 1" in the direction of the longitudinal axis L can be achieved. The rotation is described by the rotation angle β, as is shown in FIG. 31.

For a connection of screw and nut with a metrical thread for screw connection which are common in daily life, a plurality of rotations of the screw or nut for establishing the connection is necessary. In contrast to that, in case of the steep thread of the bayonet connector 1", which may be less than one complete rotation of the bayonet connector 1"

about its longitudinal axis L is enough to establish the connection between the at least two components B1 and B2. The thread webs 30" of the steep thread may be configured such that the connection with a rotation angle β<360°, or β≤180° or β≤100° can be established completely.

With the help of the configuration possibilities of the thread webs 30", the fastening effort, i.e. the extent of the fastening rotation and the time necessary for that, can be adjusted and adapted in a targeted manner. According to a further design of the bayonet connector 1", a rotation β by 90° may be sufficient for completely establishing the connection.

As can be seen based on FIGS. 22 to 30, the thread webs 30" may include a continuously increasing radial width in their axial course in the direction of the bottom side 14" of the head 10". Accordingly, the thread webs 30" have the biggest radial width or expansion adjacent to the head 10", which is determined perpendicular to the longitudinal axis L of the bayonet connector 1".

Adjacent to the end of the shaft 20" which faces away from the head, the radial width of the thread webs 30" may be zero or insignificantly small for having a mechanical impact.

The end of the shaft 20" which faces away from the head may have a finder tip 22. The finder tip 22 is a tip-like structure and realizes a tapering or a pointed end of the shaft 20" in the direction facing away from the head.

As the finder tip 22 has a smaller radial expansion than the shaft 20" or the thread webs 30", it facilitates an inserting or a finding of the component openings 92 and 90 in the first B1 and second component B2. For this purpose, the finder tip 22 is pointed, rounded, blunt, angular or similarly formed in order to support the establishing of the connection between the components B1, B2.

According to a further design, the thread webs 30" are shown with a decreasing radial width in the direction of the screwing-in R of the bayonet connector 1". The thread webs 30" may be provided with a constant radial width (not shown). When the thread webs 30" with constant radial width may be combined with the finder tip 22, they also guarantee a reliable connecting with the components B1, B2.

The helical course of the two thread webs 30" may be characterized by the pitch angle α (see FIG. 26). The pitch angle α determines which inclination angle the thread web 30" includes with respect to the normal to the longitudinal axis L. The pitch angle α lies in a range of 10°≤α≤60°, or 30°≤α≤50° and in at least some implementations in a range of 40°≤α≤45°. The bigger the pitch angle α chosen from the given ranges is, the higher is the axial offset of the bayonet connector 1", parallel to the longitudinal axis L, which can be achieved with the same rotation angle β of the bayonet connector 1".

In a further design of the bayonet connector 1", the pitch angle α is equal 43.1° as by that, the manufacturing requirements with regard to the connection are suitably fulfilled.

The thread webs 30" each have fastening means 36" at a face side 35 which faces the head bottom side 14". These fastening means 36" correspond to the above-described fastening means 36; 36' of the bayonet connector 1; 1' in terms of their form, design, size and function. Therefore, reference is made to the above description for explaining the fastening means 36".

A drive means 16" or generally an opening or recess of a certain form is provided at the head upper side 12". The drive means 16" or the recess serves for the form-fit engagement of a tool in order to fasten or release the bayonet connector 1". Furthermore, the opening or recess may be provided to serve as a help for finding and/or gipping and/or orienting for a robot, which installs the bayonet connector 1".

At the head bottom side 14", a flange-like projection 15 may be provided. This projection 15 projects from the head bottom side 14" in a direction facing away from the head. The projection 15 may be configured round and is arranged concentrically to the longitudinal axis L. Furthermore, the projection 15 has a radial outer side at which a plurality of pre-positioning webs 13 in the form of bumps, webs, elevations or the like are arranged, projecting radially to the outside. The plurality of pre-positioning webs or bumps or elevations 13, respectively, may be arranged evenly distributed over the circumference of the projection 15.

The individual bumps or elevations 13 are arranged in combination with the projection 15 such that the projection 15 has a smaller radial expansion and the bump 13 in combination with the projection 15 has a bigger radial expansion than the inner diameter of the first component opening 92 in the first component B1. Accordingly, the bayonet connector 1" is insertable into the component opening 92 and retains there in a frictional or locking manner at the edge of the component opening 92. In this way, the bayonet connector 1" is pre-positionable in the first component opening 92 and can be transported, may be fastened in a loss-proof manner, together with the first component B1.

It becomes clear from the above description that the flange-like projection 15 serves for the positioning and stabilizing of the pre-positioning webs 13, i.e. the bumps or elevations 13. Accordingly, webs instead of the projection 15 may be provided at the head bottom side 14" for arranging the bumps 13. These webs (not shown) define and stabilize the position of the bumps 13 so that the bayonet connector 1" is pre-positionable in the first component opening 92.

The described pre-positioning webs 13, which may be the bumps 13, correspondingly realize a similar function as the above-described positioning webs 40; 40'. Thereby, the pre-positioning webs 13 only retain the bayonet connector 1" in the first component opening 92 of the first component B1 without fixing a position of the bayonet connector 1" in the first component opening 92, i.e. a specific rotation angle position relative to the first component.

A connection or component composite consisting of at least the first component B1 and the second component B2 is shown in FIG. 30. According to a further design, the second component B2 is a door frame of a motor vehicle and the first component B1 is an aggregate carrier for a motor vehicle door. In an aggregate carrier, such as a motorized window lifter, a loudspeaker, electric circuit elements for that and the like are arranged. In order to fasten the aggregate carrier in the door frame, the bayonet connector 1" may be fastened in a pre-positioned manner in an opening of the aggregate carrier. For this purpose, the bumps 13 or elevations 13 may establish a frictional connection with the inner edge of the opening 92 in the first component B1 or aggregate carrier or they lock in this opening 92.

After inserting the bayonet connector 1" in the component opening 92 of the first component B1, the finder tip 22 for finding the keyhole 90 and for correspondingly aligning the bayonet connector 1" may be used. As soon as the bayonet connector 1" has been aligned in a matching manner with respect to the keyhole 90, it is rotated about the longitudinal axis L in accordance with a thread direction of the thread webs 30". As soon as the thread webs 30" engage into the radial slots of the keyhole 90, the bayonet connector 1" is drawn into or screwed into the keyhole 90 due to the rotation about the rotation angle β. Analogously, this process can also be described such that the second component B2 is drawn against the bottom side 14" of the head 10" of the bayonet connector 1". Accordingly, the components B1, B2 are pressed together and pressed against the bottom side 14" of the head 10". Once the rotation of the bayonet connector 1" is completed, the fastening means 36" are locked or anchored in the openings 50" in the second component B2 (see FIG. 29 or 30). The fastening means 36" may be frictionally fastened at the component B2 in case no openings 50" are provided.

The present disclosure furthermore includes the connection method for at least the first component B1 with the first opening 92 and the second component B2 with the keyhole 90 with the help of the above-described bayonet connector 1; 1'; 1" according to the different embodiments. The connection method includes the following steps: stack-like arranging of the first B1 and the second component B2, so that the first opening 92 and the keyhole 90 are aligned with each other, plugging the shaft 10 with the radial webs 30; 30' or the thread webs 30" into the keyhole 90, rotating the bayonet connector 1; 1'; 1" about its longitudinal axis L within the first opening 92 and the keyhole 90 and retaining, which may be clamping, the first component B1 and the second component B2 between the head 10; 10'; 10" and the radial webs 30; 30' or the thread webs 30" of the bayonet connector 1; 1'; 1".

It is within the connection method that the first component B1 may be provided with a bayonet connector 1; 1'; 1" that is pre-positioned in the first opening 92 of the first component B1. The first component B1 and the second component B2 firstly be positioned in a stack-like arrangement such that the first opening 92 in the first component B1 is aligned to the keyhole 90 in the second component B2. After that, the bayonet connector 1; 1' may be plugged through the first opening 92 and the keyhole 90, so that the bottom side 14; 14' of the head 10; 10' of the bayonet connector 1; 1' rests at the first component B1.

As soon as the bayonet connector has been inserted into the first opening and the keyhole which are aligned to each other, a rotation of the bayonet connector about its longitudinal axis takes place. This rotation of the bayonet connector about its longitudinal axis may include a rotation angle smaller than 180° and in at least some implementations, at most 90°. With the help of this rotation, the radial webs are firstly positioned such that they are no longer aligned with the keyhole of the second component.

When using the bayonet connector 1" with thread webs 30", the bayonet connector 1" cannot be plugged into the keyhole 90 of the second component B2. This is prevented by the course of the helically bent thread webs 30". Accordingly, the bayonet connector 1" is already rotated during the inserting or during the moving through the keyhole 90 of the second component B2. The rotation direction may be dependent on whether the thread webs 30" define a right-handed or a left-handed thread. At the end of the fastening rotation, the fastening means 36 lock or clamp at the bottom side of the second component B2.

In this way, i.e. due to the rotation of the bayonet connector 1; 1'; 1" about its longitudinal central axis L according to the different constructions of the bayonet connector 1; 1'; 1", a form-fit connection between the bayonet connector 1; 1'; 1" and the at least two components is realized. The rotation of the bayonet connector 1; 1'; 1" also serves for bringing the fastening means 36; 36' of the radial webs 30; 30' into interaction with the at least second component B2. This interaction is, for example, a locking of a fastening means 36; 36' that is provided as a locking means, at the radial webs 30; 30' at the second component B2. In this way, an additional force-fit connection between the bayonet connector 1; 1'; 1" and the at least two components B1, B2 may be achieved supplementary to the above-described form-fit connection.

Accordingly, the radial webs 30; 30' may include locking projections facing the head, each locking into a recess 50 or an opening 50 at the second component B2 when the bayonet connector 1; 1'; 1" is rotated. According to a further embodiment, the radial webs 30; 30' have ramp slopes facing the head, which clamp the first and the second component between head and radial webs of the bayonet connector 1; 1'; 1" when rotating the bayonet connector 1; 1'; 1" about its longitudinal axis L.

According to a further design, the above-described connection method comprises the following step: before the inserting of the shaft 20" with thread webs 30" into the keyhole 90, searching the keyhole 90 with the finder tip 22 and aligning the bayonet connector 1" with the keyhole 90 for the screwing in. The finder tip 22 which has already been described above may be used for pre-positioning the bayonet connector 1" with thread webs 30". This finder tip 22 is, in the direction facing away from the head, directed to the components B1, B2 to be connected. As the finder tip 22 first of all encounters the first component B1 or the second component B2, the finder tip 22 supports a plugging-in of the bayonet connector 1" into the respective component opening due to its small radial extension. Because for this pre-positioning or the first inserting of the finder tip 22 particularly into the opening 90 in the second component B2, it is in the first instance not necessary that the thread webs 30" be aligned in a matching manner to the radial openings of the keyhole 90 or the radial slots, respectively. The finder tip 22 stabilizes the bayonet connector 1" in this position and thus facilitates the matching orientating of the thread webs 30" to the radial slots of the keyhole 90 in the second component B2.

The invention claimed is:

1. A one-part male bayonet connector with which at least one first component and a second component are releasably connectable with each other in a non-destructive manner via an opening in each of the at least one first component and the second component, the bayonet connector having a T-like form in a lateral view, wherein
  the bayonet connector comprises a head, a central shaft extending from there and two radially opposite thread webs extending from the central shaft and being configured rigidly, wherein each of the two thread webs comprises a fastening means of the bayonet connector facing the head, so that by means of a form-fit bayonet connection, the at least one first component and the second component are fastenable between a bottom side of the head and the fastening means of the thread webs such that the bottom side of the head is configured to be arranged at a side of the at least one first component facing away from the second component and the fastening means are configured to be arranged in recesses of the second component or at a side of the second component facing away from the at least one first component, wherein
  the two thread webs define a right-handed thread or a left-handed thread and include a pitch angle a with respect to a plane that is normal to a central longitudinal axis of the central shaft in the range of 30°<α<50°, wherein the fastening means of each thread web is a locking web or a semi-spherical like projection and the two thread webs include a continuously decreasing radial extension in the direction facing away from the head of the shaft, so that the radial extension of the thread webs at the end of the shaft which faces away from the head has reduced to zero and, in an axial direction opposite of the head, the bayonet connector ends in a finder tip which is formed pointed, rounded, blunt or angular.

2. The bayonet connector according to claim 1, in which the two thread webs define a steep thread so that the bayonet connector is completely fastenable with a rotation about its longitudinal axis by a rotation angle β of β<360°.

3. The bayonet connector according to claim 1 in which the two thread webs have a smaller radial extension than the head.

4. The bayonet connector according to claim 1, which comprises at least one pre-positioning web which extends from a flange-like offset bottom side of the head in radial direction in order to be lockable at an opening edge of the first component.

5. The bayonet connector according to claim 1 which consists of plastic or metal.

6. A component composite of at least one first component and a second component and the bayonet connector according to claim 1, in which the first component is arranged adjacent to the head of the bayonet connector and includes a first opening and the second component includes a key hole, so that the head rests at the first component, the central shaft with the thread webs passes through the first opening and the key hole and the thread webs are locked at the second component in a way facing away from the head.

7. A component composite of at least one first component and the bayonet connector according to claim 1, in which the bayonet connector is releasably locked with a plurality of pre-positioning webs in the form of bumps of a flange-like projection at a bottom side of the head of the bayonet connector at an edge of a first opening of the first component.

8. A connection method for at least one first component with a first opening and a second component with a keyhole with the bayonet connector according to claim 1 which includes the following steps:

a. stack-like arranging of the first and the second component that the first opening and the keyhole are aligned with each other,
b. plugging the central shaft with the thread webs into the keyhole,
c. rotating the bayonet connector about its longitudinal axis within the first opening and the keyhole and
d. retaining, the first and the second component between the head and the thread webs of the bayonet connector.

9. The connection method according to claim 8 with the further step:
providing the first component with the first opening, in which the bayonet connector is pre-positioned via a pre-positioning web at the head of the bayonet connector, or
providing the first component with the first opening and the bayonet connector separate from each other and plugging the bayonet connector into the first opening in the stack-like arrangement out of the first and the second component.

10. The connection method according to claim 8, in which each fastening means of the two thread webs includes a locking projection facing the head, which, when rotating the bayonet connector each lock into a recess or an opening at the second component.

11. The connection method according to claim 8, in which the thread webs include ramp slopes facing the head, which, when rotating the bayonet connector about its longitudinal axis clamp the first and the second component between the head and the thread webs of the bayonet connector.

12. The connection method according to claim 8 with the further step:
before plugging the central shaft with the two thread webs into the keyhole searching of the keyhole with the finder tip of the central shaft and aligning the bayonet connector for screwing in.

13. The connection method according to claim 8, with the further step:
when rotating the bayonet connector, screwing in the thread webs into the keyhole and drawing together the first and the second component via a screw connection between the thread webs and the keyhole.

* * * * *

UNITED STATES PATENT AND TRADEMARK OFFICE
CERTIFICATE OF CORRECTION

| | | |
|---|---|---|
| PATENT NO. | : 12,385,513 B2 | Page 1 of 1 |
| APPLICATION NO. | : 17/299862 | |
| DATED | : August 12, 2025 | |
| INVENTOR(S) | : Jörg Matthes et al. | |

It is certified that error appears in the above-identified patent and that said Letters Patent is hereby corrected as shown below:

In the Specification

Column 11, Line 41, after "bayonet" delete "lock" and insert --connector--

Signed and Sealed this
Fourteenth Day of October, 2025

John A. Squires
*Director of the United States Patent and Trademark Office*